US012304225B2

(12) United States Patent
Ogura

(10) Patent No.: US 12,304,225 B2
(45) Date of Patent: May 20, 2025

(54) PRINTER

(71) Applicant: Roland DG Corporation, Hamamatsu (JP)

(72) Inventor: Yoshinari Ogura, Hamamatsu (JP)

(73) Assignee: ROLAND DG CORPORATION, Shizuoka (JP)

(*) Notice: Subject to any disclaimer, the term of this patent is extended or adjusted under 35 U.S.C. 154(b) by 189 days.

(21) Appl. No.: 18/134,072

(22) Filed: Apr. 13, 2023

(65) Prior Publication Data

US 2023/0331012 A1 Oct. 19, 2023

(30) Foreign Application Priority Data

Apr. 14, 2022 (JP) ................................ 2022-067136

(51) Int. Cl.
*B41J 25/00* (2006.01)
*B41J 2/21* (2006.01)

(52) U.S. Cl.
CPC ............ *B41J 25/006* (2013.01); *B41J 2/2132* (2013.01)

(58) Field of Classification Search
CPC .... B41J 2/2117; B41J 2/04563; B41J 2/2114; B41J 2/01; B41J 11/0015; B41J 11/002; B41J 3/4078; B41J 2/15; B41J 2/2132; B41J 2/04505; C09D 11/54; C09D 11/40; D06P 5/30; B41M 5/0017; B41M 5/0047
See application file for complete search history.

(56) References Cited

U.S. PATENT DOCUMENTS

| | | | | |
|---|---|---|---|---|
| 6,394,579 B1 * | 5/2002 | Boyd | B41J 2/15 | 347/43 |
| 6,502,920 B1 * | 1/2003 | Anderson | B41J 2/0458 | 43/41 |
| 11,414,562 B2 * | 8/2022 | Matsuzaki | C09D 11/322 | |
| 2007/0242098 A1 * | 10/2007 | Sudo | B41J 2/2132 | 347/40 |
| 2008/0149027 A1 * | 6/2008 | Kawase | B41J 2/2103 | 118/314 |
| 2012/0081461 A1 * | 4/2012 | Kakutani | B41J 2/2117 | 347/43 |
| 2016/0194824 A1 * | 7/2016 | Ohashi | D06P 5/30 | 524/507 |
| 2019/0100672 A1 * | 4/2019 | Mizutani | C09D 11/033 | |

(Continued)

FOREIGN PATENT DOCUMENTS

| | | |
|---|---|---|
| JP | 2020-032600 A | 3/2020 |
| JP | 2021-066165 A | 4/2021 |

*Primary Examiner* — John Zimmermann
(74) *Attorney, Agent, or Firm* — Keating & Bennett, LLP

(57) ABSTRACT

A printer includes a first head including a first nozzle array including first nozzles arranged in a first direction and capable of ejecting a first liquid, a second head including a second nozzle array including second nozzles arranged in the first direction and capable of ejecting a second liquid on the first liquid, a first mover to relatively move the first head, the second head, and a medium in the first direction, and a second mover to move the first head and the second head in a second direction intersecting the first direction. An interval in the first direction between a range of use of the first nozzle array and a range of use of the second nozzle array is changed, while lengths of the range of use of the first nozzle array and the range of use of the second nozzle array in the first direction are respectively maintained.

13 Claims, 16 Drawing Sheets

(56) References Cited

U.S. PATENT DOCUMENTS

| | | | |
|---|---|---|---|
| 2020/0070546 A1 | 3/2020 | Mizutani et al. | |
| 2021/0114381 A1* | 4/2021 | Efendi | D06P 5/30 |
| 2023/0022251 A1* | 1/2023 | Ando | C09D 11/322 |

* cited by examiner

PRINTER

CROSS-REFERENCE TO RELATED APPLICATION

The present application claims priority pursuant to 35 U.S.C. § 119 from Japanese patent application number 2022-067136 filed on Apr. 14, 2022, the entire disclosure of which is hereby incorporated by reference herein.

BACKGROUND OF THE INVENTION

1. Field of the Invention

The present disclosure relates to a printer.

2. Description of the Related Art

Japanese patent application publication number 2021-066165 describes a device that forms a first image on a record medium with an ejection of a first liquid and then forms a second image with an ejection of a second liquid onto the first image. According to Japanese patent application publication number 2021-066165, a time interval (drying time) between formation of the first image and formation of the second image is changed by changing at least one of the number of nozzles to eject the first liquid or the number of nozzles to eject the second liquid, based on the amount of the second liquid to be applied to the record medium.

However, image quality may be varied when the number of nozzles to eject the liquid is changed as described in Japanese patent application publication number 2021-066165.

SUMMARY OF THE INVENTION

A first aspect of a preferred embodiment of the present disclosure is a printer including a first head including a first nozzle array including a plurality of first nozzles arranged in a first direction and capable of ejecting a first liquid, a second head including a second nozzle array including a plurality of second nozzles arranged in the first direction and capable of ejecting a second liquid that is to be ejected on the first liquid, a first mover to relatively move the first head, the second head, and a medium in the first direction, and a second mover to move the first head and the second head in a second direction intersecting the first direction, wherein an interval in the first direction between a range of use of the first nozzle array and a range of use of the second nozzle array is changed, while lengths of the range of use of the first nozzle array and the range of use of the second nozzle array in the first direction are respectively maintained.

Further, a second aspect of a preferred embodiment of the present disclosure is a printer including a first head including a first nozzle array including a plurality of first nozzles arranged in a first direction and capable of ejecting a first liquid, a second head including a second nozzle array including a plurality of second nozzles arranged in the first direction and capable of ejecting a second liquid that is to be ejected on the first liquid, a first mover to relatively move the first head, the second head, and a medium in the first direction, and a second mover to move the first head and the second head in a second direction intersecting the first direction, wherein an interval in the first direction between a range of use of the first nozzle array and a range of use of the second nozzle array is changed, while an amount of movement when the first mover relatively moves the first head, the second head, and the medium in the first direction is maintained.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1A:
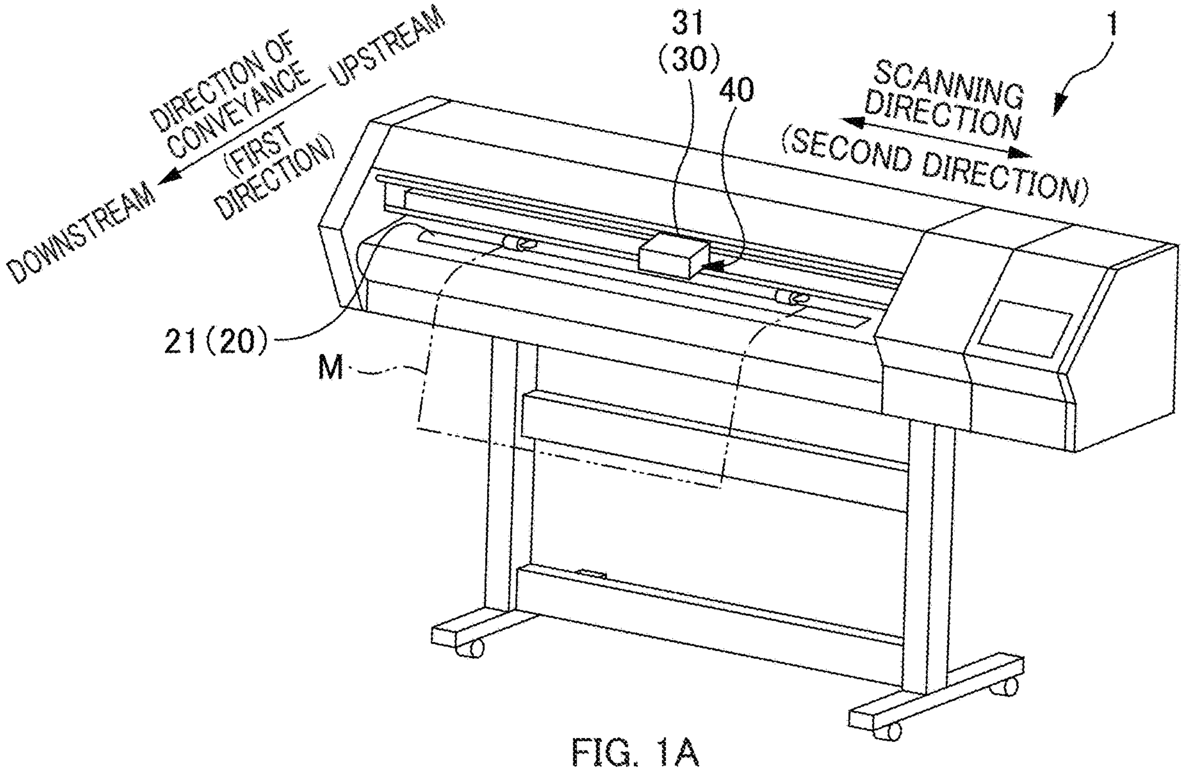
FIGS. 1A and 1B are explanatory diagrams of a basic configuration of a printer 1.
Figure 1B:
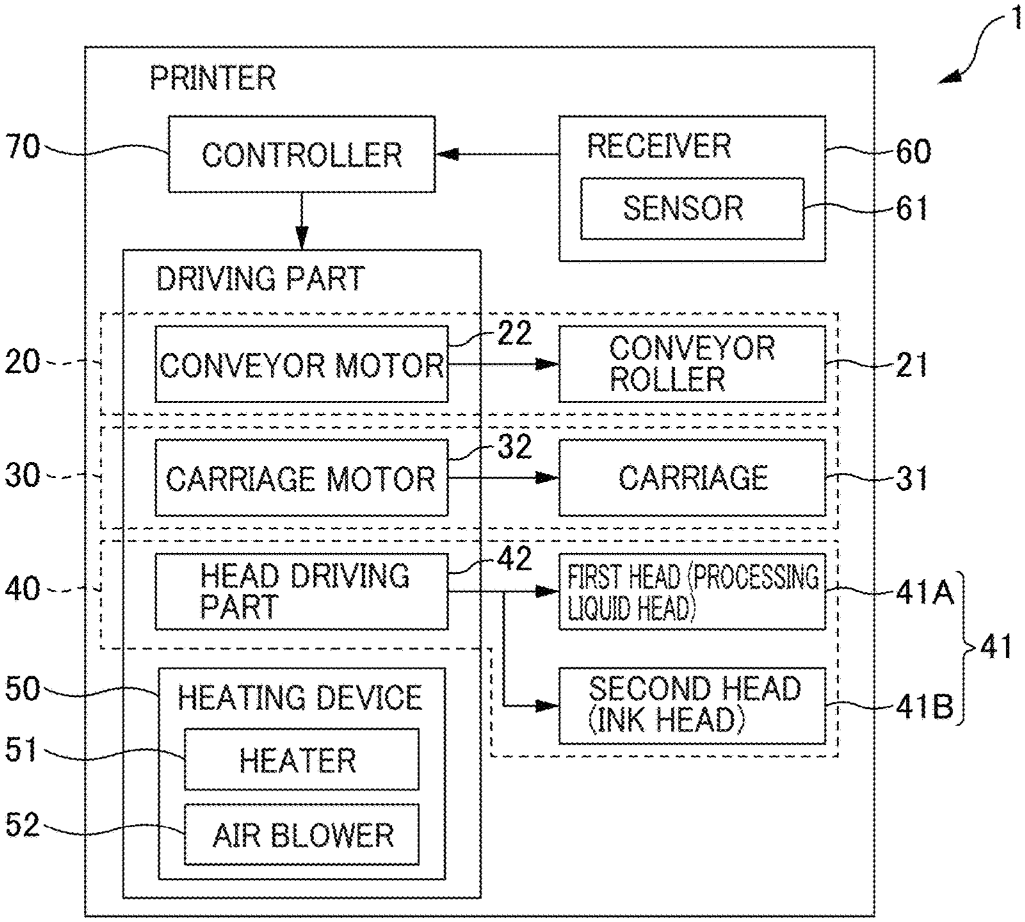
Figure 2:
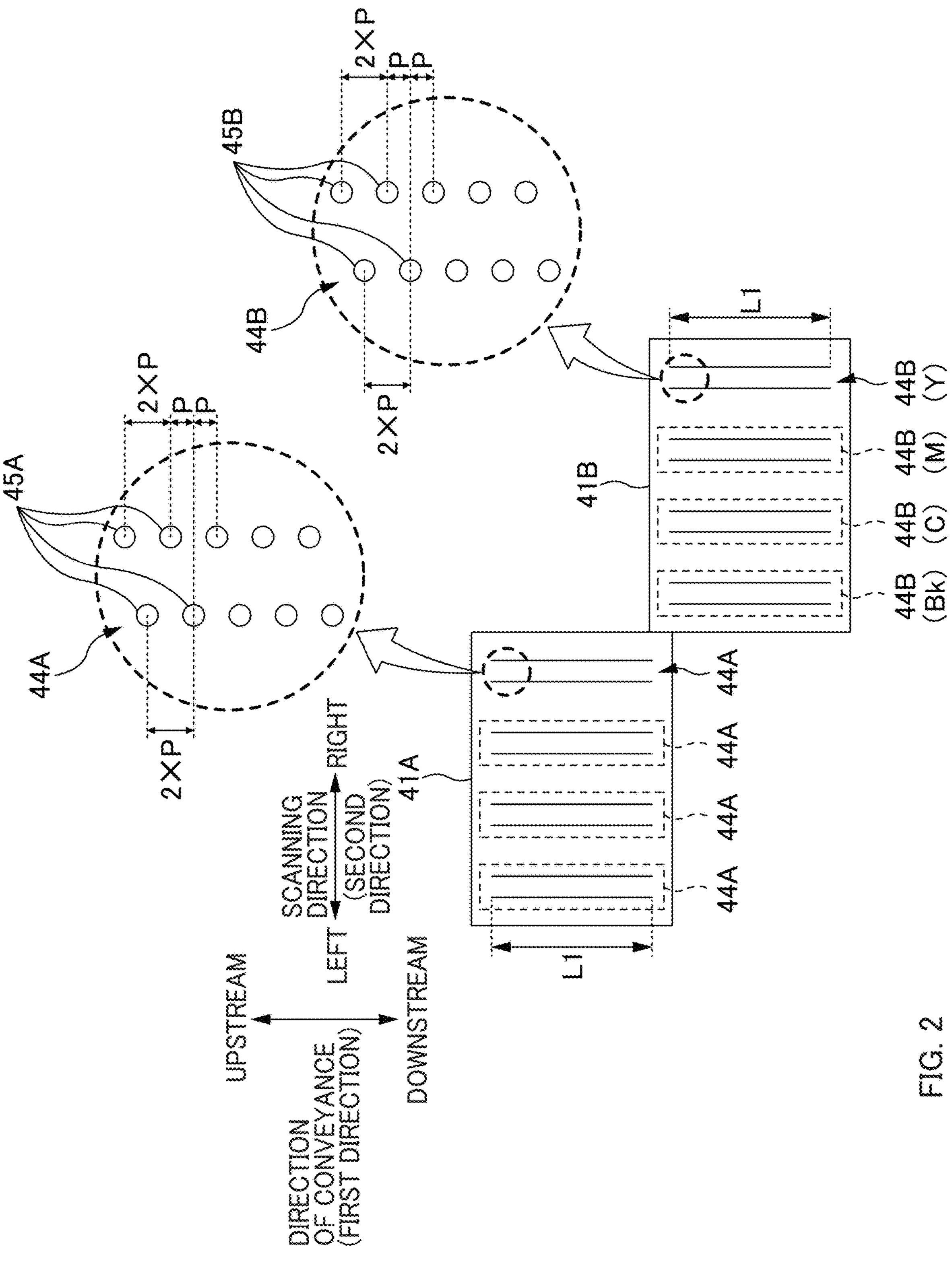
FIG. 2 is an explanatory diagram of a configuration of a head unit 40.

FIGS. 1A and 1B are explanatory diagrams of an example of a configuration of a printer 1. FIG. 1A is a schematic explanatory diagram of an appearance of the printer 1. FIG. 1B is a block diagram of the printer 1. FIG. 2 is an explanatory diagram of a configuration of a head unit 40.

Hereinafter, a direction in which plural nozzles 45 of a nozzle array 44 are arranged may be referred to as “first direction". As to the printer 1 illustrated in FIG. 1A, the first direction corresponds to a direction of movement of a medium M, and thus the first direction may be referred to as "direction of conveyance". The side of an unused area of the medium M when viewed from the nozzle array may be referred to as "upstream (upstream side)" and the opposite side thereof may be referred to as "downstream (downstream side)". In the case of the printer 1 illustrated in FIG. 1A, the supply side of the medium M is referred to as "upstream (upstream side)" and the discharge side of the medium M is referred to as "downstream (downstream side)". Note that the first direction may be referred to as "sub-scanning direction". Further, the direction in which a carriage 31 (or head 41) moves may be referred to as "second direction". The second direction is a direction intersecting the first direction. The second direction may be referred to as "scanning direction" or "main scanning direction".

The printer 1 is an apparatus to print an image on the medium M (printing paper, printing film, etc.). Specifically, the printer 1 is an inkjet printer. The printer 1 includes a first moving unit 20 (first mover), a second moving unit 30 (second mover), a head unit 40 (head), a heating device 50 (heater), a receiver 60, and a controller 70.

The first moving unit 20 is a unit to relatively move the head 41 (41A, 41B) and the medium M in the first direction. Here, the first moving unit 20 is a conveyor unit to move the medium M in the first direction (direction of conveyance). Here, the first moving unit 20 (conveyor unit) includes a conveyor roller 21 and a conveyor motor 22, for example. The conveyor roller 21 is rotatable to convey the medium M in the direction of conveyance. The conveyor motor 22 is a motor (driver) to rotate the conveyor roller 21. Note that the first moving unit 20 is not limited to a configuration in which the conveyor roller 21 is used. For example, the first moving unit 20 may have a conveyor bed (flatbed) and be configured to move this conveyor bed, to thereby convey the medium M in the direction of conveyance. Also, the first moving unit 20 is not limited to the one that moves the medium M in the first direction (direction of conveyance). For example, the first moving unit 20 may move the second moving unit 30 (carriage unit) in the first direction, to thereby relatively move the head 41 (41A, 41B) and the medium M in the first direction. In the following explanation, the operation of the first moving unit 20 relatively moving the head 41 (41A, 41B) and the medium M in the first direction may be referred to as "first moving operation". The medium M may be a long printing medium such as a roll of paper, or may be a single sheet of paper. The medium M is not limited to paper, but may also be film, cloth, or the like.

The second moving unit 30 is a unit to move the head 41 (41A, 41B) in the second direction. The second moving unit 30 moves the carriage 31 in the second direction, to thereby move the head 41 mounted to the carriage 31 in the second direction. In other words, the second moving unit 30 is a carriage unit to move the carriage 31. The second moving unit 30 includes the carriage 31 and a carriage motor 32. The carriage 31 is able to reciprocate in the second direction (scanning direction), and includes the head 41 (first head 41A and second head 41B, described later) mounted thereto. The carriage motor 32 is a motor (driver) to move the carriage 31 in the scanning direction. In the following explanation, the operation of the second moving unit 30 of moving the head 41 (41A, 41B) in the second direction may be referred to as "second moving operation".

The head unit 40 is a unit to eject liquid (such as ink and processing liquid) to the medium M. The head unit 40 includes the first head 41A and the second head 41B.

The first head 41A is a head to eject a first liquid. The first head 41A includes a first nozzle array 44A including a plurality of first nozzles 45A arranged in the first direction (direction of conveyance), the plurality of first nozzles 45A being capable of ejecting the first liquid. The second head 41B is a head to eject a second liquid. The second liquid is a liquid different from the first liquid, and is to be ejected onto the first liquid. The second head 41B has a second nozzle array 44B including a plurality of second nozzles 45B arranged in the first direction (direction of conveyance), the plurality of second nozzles 45B being capable of ejecting the second liquid. In the first preferred embodiment, the first head 41A is a processing liquid head to eject the processing liquid (corresponding to the first liquid), and the second head 41B is an ink head to eject ink (corresponding to the second liquid). However, as described later, the first head 41A does not have to be the processing liquid head, and the second head 41B does not have to be the ink head. In the following, the processing liquid head (corresponding to the first head) is given the reference numeral 41A, and the ink head (corresponding to the second head) is given the reference numeral 41B.

The processing liquid head 41A is a head including plural nozzles (processing liquid nozzles 45A; corresponding to the first nozzles) to eject processing liquid. The processing liquid is also referred to as an undercoat, optimizer, pretreatment agent, adjuster, transparent ink, special ink, or primer. The processing liquid may be a liquid to thicken ink or coagulate/insolubilize color materials, to thereby fix the ink to the medium M, for example. Here, the processing liquid is a transparent liquid. However, the processing liquid does not have to be transparent. The processing liquid head 41A includes plural nozzle arrays (processing liquid nozzle arrays 44A; corresponding to the first nozzle arrays) (here, the processing liquid head 41A has four processing liquid nozzle arrays 44A). The plural processing liquid nozzle arrays 44A are arranged in the second direction (scanning direction). The processing liquid nozzle arrays 44A each include plural nozzles (processing liquid nozzles 45A) arranged in the first direction (direction of conveyance). Here, each of the processing liquid nozzle arrays 44A includes plural nozzles (processing liquid nozzles 45A) arranged in a staggered manner. That is, each of the processing liquid nozzle arrays 44A includes two nozzle groups. Each of the two nozzle groups includes plural nozzles (processing liquid nozzles 45A) arranged at a predetermined pitch in the first direction (direction of conveyance). One of the nozzle groups includes plural nozzles (processing liquid nozzles 45A) arranged in the direction of conveyance such that the plural nozzles in the one of the nozzle groups are displaced in the direction of conveyance by a half pitch with respect to the nozzles (processing liquid nozzles 45A) in the other one of the nozzle groups. However, each processing liquid nozzle array 44A may include plural processing liquid nozzle 45A arranged in a row in the direction of conveyance. Further, the processing liquid head 41A may only have a single processing liquid nozzle array 44A, instead of including plural processing liquid nozzle arrays 44A. In the following explanation, even in the case where the nozzle array 44 (44A) includes the plural nozzles 45 (45A) arranged in the staggered manner, a description may be given as a nozzle array in which plural nozzles are arranged in a row in the direction of conveyance. In the following explanation, the length of the processing liquid nozzle array 44A in the first direction (direction of conveyance) is denoted by L1.

An ink head 41B is a head including plural nozzles (ink nozzles 45B, corresponding to second nozzles) to eject ink. An ink is a liquid to form dots (ink dots) configuring an image (ink image, color image, etc.) on the medium M. The ink is also a liquid sometimes referred to as color ink, process ink, etc. The ink head 41B includes plural nozzle arrays (ink nozzle arrays 44B, corresponding to the second nozzle arrays). The plural ink nozzle arrays 44B are arranged in the scanning direction. For example, the ink head 41B includes a black ink nozzle array (Bk) to eject black ink, a cyan ink nozzle array (C) to eject cyan ink, a magenta ink nozzle array (M) to eject magenta ink, and a yellow ink nozzle array (Y) to eject yellow ink. These four color ink nozzle arrays 44B (black ink nozzle array, cyan ink nozzle array, magenta ink nozzle array, yellow ink nozzle array) are arranged in the scanning direction. Note that colors of ink are not limited to black, cyan, magenta, and yellow.

In the same way as in the processing liquid nozzle array 44A, each of the ink nozzle arrays 44B includes plural nozzles (ink nozzles 45B) arranged in the first direction (direction of conveyance). Here, in the same way as in the processing liquid head 41A, each of the ink nozzle arrays 44B includes plural nozzles (ink nozzles 45B) arranged in the staggered manner. However, each ink nozzle array 44B may include plural ink nozzles 45B arranged in a row in the direction of conveyance. In addition, the ink head 41B does not have to include plural ink nozzle arrays 44B. In the following explanation, the length of the ink nozzle array 44B in the first direction (direction of conveyance) is denoted by L1. However, the length of the ink nozzle array 44B in the direction of conveyance may be different from the length of the processing liquid nozzle array 44A.

As illustrated in FIG. 2, the processing liquid head 41A (corresponding to the first head) is arranged on the upstream side in the first direction (upstream side in the direction of conveyance) with respect to the ink head 41B (corresponding to the second head), and the processing liquid nozzle array 44A is arranged on the upstream side in the direction of conveyance with respect to the ink nozzle array 44B. Accordingly, the ink (corresponding to the second liquid) is ejected on the processing liquid (corresponding to the first liquid). Also, as described below, this can reduce the number of nozzles 45 (45A, 45B) not used. However, the processing liquid head 41A and the ink head 41B may be arranged side by side in the second direction (scanning direction), and the processing liquid nozzle array 44A and the ink nozzle array 44B may be arranged in the same position in the first direction (direction of conveyance). Further, the processing liquid nozzle array 44A and the ink nozzle array 44B may be arranged in the position at which the processing liquid nozzle array 44A and the ink nozzle array 44B partly overlap in the first direction (direction of conveyance).

As illustrated in FIG. 1B, the head unit 40 includes a head driving part 42. The head driving part 42 is a driver to cause a liquid (ink, processing liquid) to be ejected/not to be ejected from each nozzle of the processing liquid head 41A and the ink head 41B. For example, if the head is of a piezo type, the head driving part 42 is a piezo element. The controller 70 controls the head driving part 42, to thereby control ejecting/not ejecting of the liquid from each nozzle. The controller 70 controls the head driving part 42, to thereby control the range of use 46 (described later) of the nozzle array 44.

The heating device 50 is a device to heat the medium M (or the liquid). The heating device 50 includes a heater 51 and an air blower 52, for example. The heater 51 is disposed below a support member (platen, not illustrated) that supports the medium M. The heater 51 is a device to heat the medium M supported by the support member. The air blower 52 is a device to send hot air to the medium M. The heating device 50 may include a device different from the heater 51 and the air blower 52. The printer 1 does not have to include the heating device 50.

The receiver 60 obtains information on at least one of temperature or humidity. Here, the receiver 60 is a sensor to measure at least one of temperature or humidity. Here, the sensor 61 is an environmental sensor to measure both temperature and humidity. However, the sensor 61 may be configured to measure only one of temperature or humidity. The sensor 61 measures an environment (at least one of temperature or humidity) in the vicinity of the medium M on which the head ejects the liquid. For example, the sensor 61 may be mounted to the carriage 31, or may be disposed to the support member (platen) that supports the medium M. The sensor 61 outputs a measurement result (temperature data, humidity data, and/or the like) to the controller 70. In the following explanation, description is given of the case where the receiver 60 is the sensor 61. However, the receiver 60 may be an input part (e.g., input screen, input button, or the like) through which the information on at least one of temperature or humidity is input by a user. If the receiver 60 includes the input part instead of the sensor 61, provision of the sensor 61 is not needed, thereby being able to simplify a configuration of the printer 1. The receiver 60 may obtain a control signal to control the heating device 50, to thereby obtain the information on the temperature of the heating device 50 (temperature of the heater 51 and/or temperature of hot air sent from the air blower 52). That is, the receiver 60 may include a signal receiver to obtain a signal outputted from the controller 70 to the heating device 50. The receiver 60 is not limited to the sensor 61, the input part, or the signal receiver, but may have other configurations as long as information on at least one of temperature or humidity can be obtained.

The controller 70 is a control part to control the printer 1. The controller 70 controls the driving part (conveyor motor 22, carriage motor 32, head driving part 42, and heating device 50, etc.) of the printer 1, based on a print command from an external computer. As described below, based on the measurement result of the sensor 61, the controller 70 controls a range in which the processing liquid is ejected from the processing liquid nozzle array 44A (range of use 46A; corresponding to a first range of use) and a range in which ink is ejected from the ink nozzle array 44B (range of use 46B; corresponding to a second range of use).

FIGS. 3A to 3F are explanatory diagrams illustrating dot formation performed by the nozzle array 44. To simplify explanation, dot formation of a single nozzle array 44 is described here.

Figure 3A:
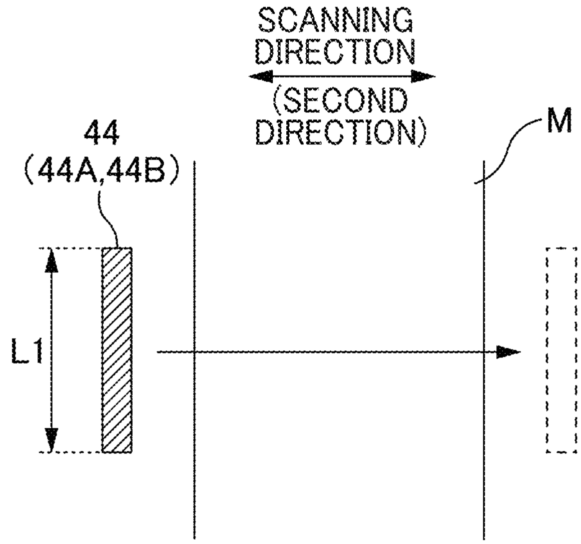
FIGS. 3A to 3F are explanatory diagrams illustrating dot formation by a nozzle array 44.
Figure 3B:
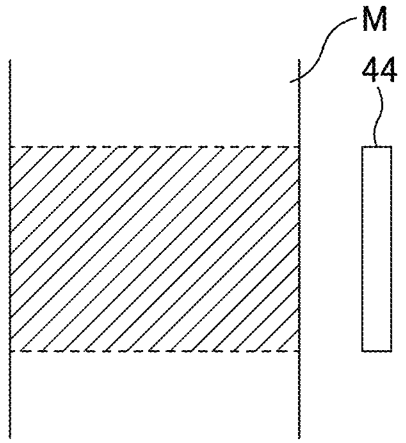

As illustrated in FIGS. 3A and 3B, the controller 70 causes the liquid (ink or processing liquid) to be ejected from the nozzle to form dots on the medium M, while moving the carriage 31 in the scanning direction (corresponding to the second direction), to thereby move the head 41 (nozzle array 44) in the scanning direction. In the following description, the operation of moving the head 41 (nozzle array 44) in the scanning direction may be referred to as "pass" (or "second moving operation", "main scanning"). In addition, n-th pass may be referred to as "pass n", and is indicated as "Pn" in the drawings. In FIG. 3B, the hatching shows an area in which dots can be formed (dot formation area) with a single pass.

Figure 3C:
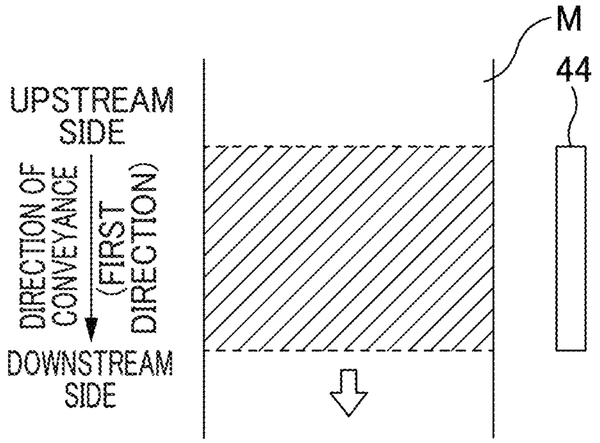
Figure 3D:
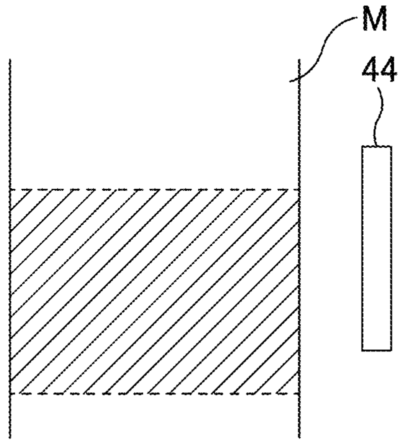

The controller 70 moves the carriage 31 in the scanning direction (after dots are formed in the medium M), and then conveys the medium M in the direction of conveyance as illustrated in FIGS. 3C and 3D. In the following explanation, this operation may be referred to as "conveying operation" (or "first moving operation", "sub-scanning"). By the conveying operation, the downstream end of the dot formation area of the immediately preceding pass moves to the outside of the dot formation area of the next pass (see FIGS. 3E and 3F), and the unused area of the medium M is supplied to the upstream end of the dot formation area of the next pass.

Figure 3E:
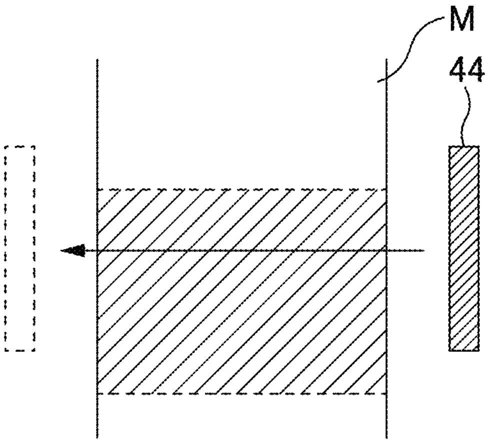
Figure 3F:
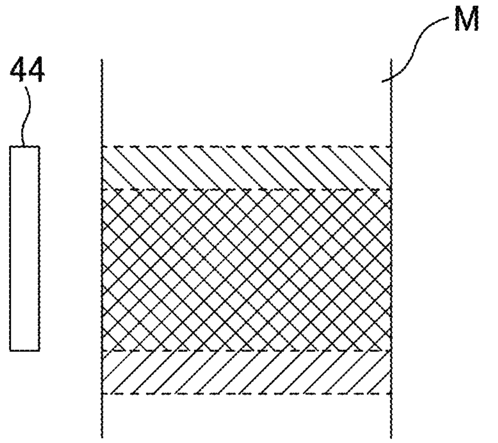

The controller 70 causes the next pass to be executed, as illustrated in FIGS. 3E and 3F after the conveying operation. In this way, the controller 70 repeats the pass and the conveying operation alternately, to form dots on the medium M. If an amount of conveyance of a single conveying operation (corresponding to an amount of movement of the first moving operation) is shorter than the length in the direction of conveyance of the dot formation area, the dot formation area overlaps with a portion of the dot formation area in the previous pass, as illustrated in FIG. 3F. In FIG. 3F, the dot formation area in which two passes overlap with each other is darkly hatched.

Figure 4A:
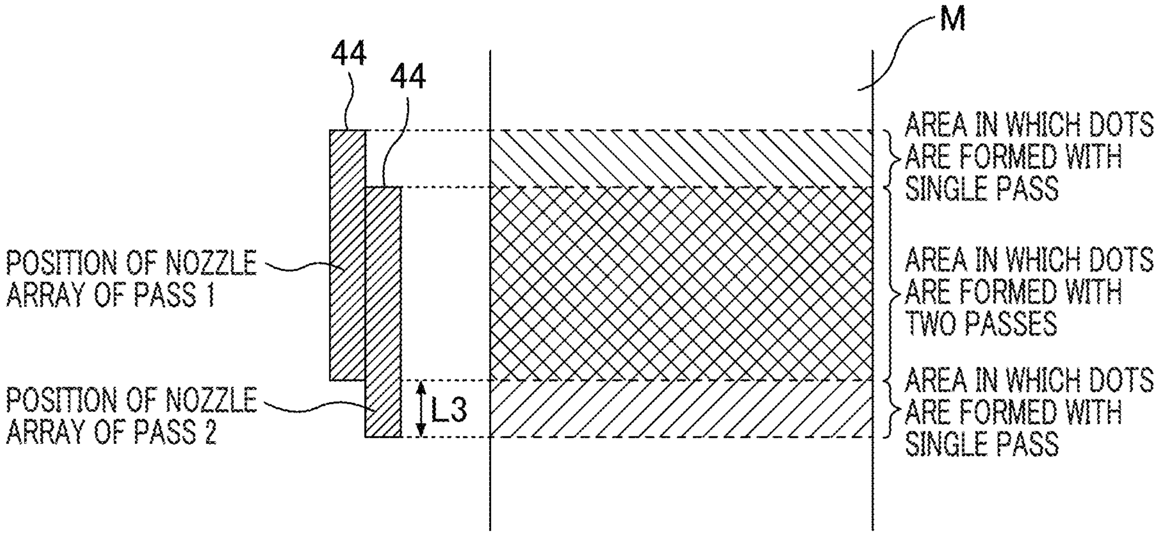
FIG. 4A is an explanatory diagram illustrating dot formation of FIGS. 3A to 3F in another way.

FIG. 4A is an explanatory diagram to illustrate the dot formation of FIGS. 3A to 3F in another way. FIG. 4A illustrates a relative positional relationship between the nozzle array 44 and the medium M in each pass. In the following explanation, as illustrated in FIG. 4A, dot formation of each pass may be described, with the position of the nozzle array 44 being changed with respect to the medium M (in other words, with the relative position between the nozzle array 44 and the medium M being changed). The amount of positional change L3 of the nozzle array 44 in the first direction (direction of conveyance) for each pass, in the drawings, indicates the amount of movement of the first moving operation performed for each pass. Here, the amount of positional change L3 indicates the amount of conveyance during the conveying operation.

Figure 4B:
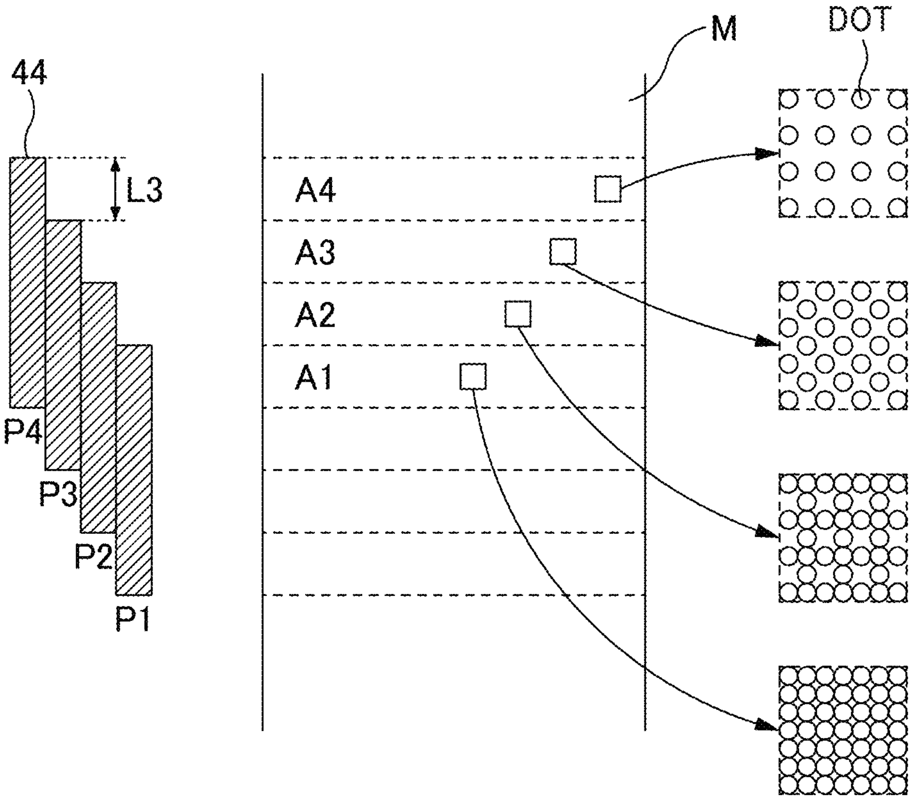
FIG. 4B is an explanatory diagram illustrating multi-pass printing.

FIG. 4B is an explanatory diagram of multi-pass printing. The multi-pass printing is a printing method, which completes dots to be formed in a predetermined area (an area with a width corresponding to the amount of conveyance for a single conveying operation) on the medium M with plural passes. FIG. 4B illustrates four-pass printing, in which four passes are performed in each area of the medium M. "Pn" in the drawing illustrates the position of nozzle array 44 in n-th pass (pass n).

The area A1 in FIG. 4B is an area in which dots are formed with four passes (passes 1 to 4). The area A2 is an area in which dots are formed with three passes (passes 2 to 4). The area A3 is an area in which dots are formed with two passes (passes 3 and 4). The area A4 is an area in which dots are formed with a single pass (pass 4). In the case of four-pass printing, all of the dots to be formed are formed in the area A1. In the area A2, approximately ¾ of the dots to be formed are formed. In the area A3, approximately ½ of the dots to be formed are formed. In the area A4, approximately ¼ of the dots to be formed are formed. The dots formed in each pass (pass 1 to pass 4), are dispersedly arranged. In this way, in the multi-pass printing, the dots formed in each pass are dispersedly arranged, which can improve the image quality more as compared to the printing method of completing the dots to be formed with a single pass (one-pass printing).

In the case of four-pass printing, the amount of conveyance L3 during the conveying operation is approximately ¼ of the range of the nozzles (range of use of the nozzle array 44) to eject a liquid (ink or processing liquid). In the case of four-pass printing in which ink is ejected from all the nozzles of the nozzle array 44, the amount of conveyance L3 during the conveying operation is about ¼ of the length L1 of the nozzle array.

Figure 5:
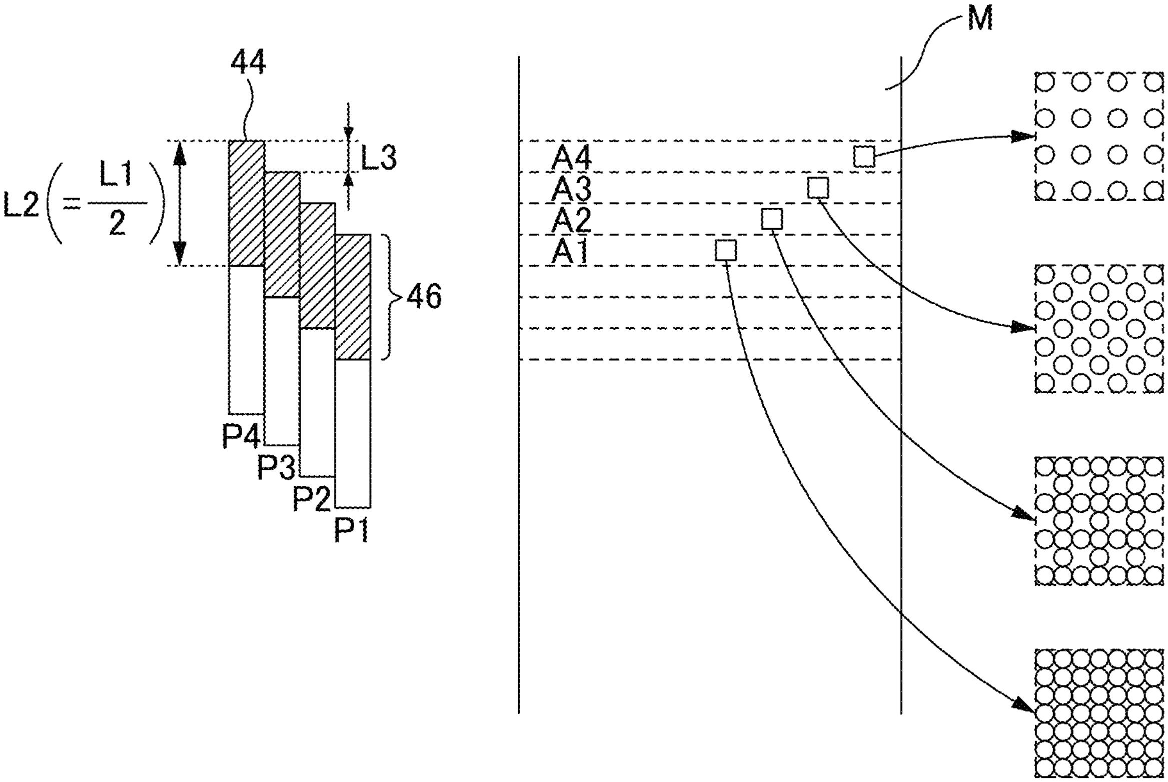
FIG. 5 is an explanatory diagram illustrating a case where four-pass printing is performed with a narrower range of use of a nozzle array 44.

FIG. 5 is an explanatory diagram illustrating the case where four-pass printing is performed with the range of use of the nozzle array 44 being narrowed.

In the drawing, among the nozzle arrays 44 illustrated in the rectangular shape, a hatched range is a range to which the nozzles to eject a liquid (ink or processing liquid) belong. It is assumed that the nozzles belonging to the range without hatching are not used, and that these nozzles are not to eject a liquid. In the following explanation, among the nozzle arrays 44 illustrated in the rectangular shape, the range (hatched range in the drawing) to which the nozzles to eject a liquid (ink or processing liquid) belong may be referred to as "range of use", and the range (range without hatching in the drawing) to which the non-use nozzles that are not to eject a liquid belong may be referred to as "range of non-use". Here, in the nozzle array 44, a half on the upstream side in the direction of conveyance corresponds to the range of use 46, and another half on the downstream side in the direction of conveyance corresponds to the range of non-use. Here, a length L2 is the length of the range of use 46 in the direction of conveyance, and the length L2 is half of the length L1.

In the case where four-pass printing is performed by using half of the nozzle array 44 as well, the amount of conveyance L3 during the conveying operation is approximately ¼ of the length L2 (the length of the range of use 46 of the nozzles in the direction of conveyance). Note that the amount of conveyance L3 during the conveying operation illustrated in FIG. 5 is half the amount of conveyance L3 during the amount of conveyance illustrated in FIG. 4B. In this way, even in the case where the same number of passes is used for multi-pass printing (e.g., four-pass printing), the amount of conveyance during the conveying operation varies with the length of the range of use of the nozzle array in the direction of conveyance. When the amount of conveyance during the conveying operation varies, the length in the direction of conveyance in each area of the areas A1 to A4 will vary (see FIG. 4B and FIG. 5). Thus, even when the multi-pass printing is performed with the same number of passes (e.g., four-pass printing), image quality thereof may result in varying.

Figure 6:
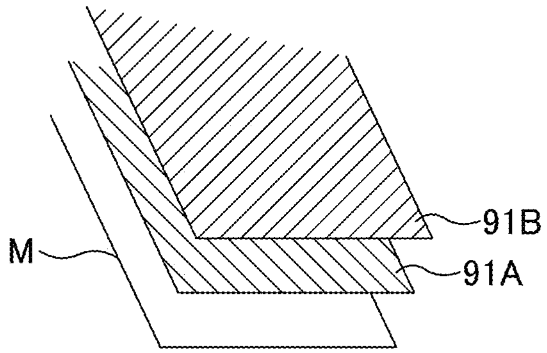
FIG. 6 is an explanatory diagram of image layers.

FIG. 6 is an explanatory diagram of image layers. In the drawing, the layer indicating a processing liquid image 91A (corresponding to a first image), the layer indicating an ink image 91B (corresponding to a second image), and the layer indicating the medium M are separated up and down. In reality, the processing liquid image 91A and the ink image 91B are layered on the medium M.

The processing liquid image 91A is an image configured with dots (processing liquid dots; first dots) that are formed of processing liquid. The ink image 91B is an image (color image) configured with dots (ink dots; second dots) that are formed of ink. The ink image 91B is an image formed on the processing liquid image 91A. As illustrated in the drawings, the printer 1 forms the processing liquid image 91A, which is configured with the processing liquid dots, on the medium M, and forms the ink image 91B, configured with ink dots, on the medium M on which the processing liquid image 91 is formed. With the formation of the ink dots on the medium M applied with the processing liquid, the ink dots can preferably be fixed on the medium M, thereby being able to improve the quality of printed image.

Figure 7:
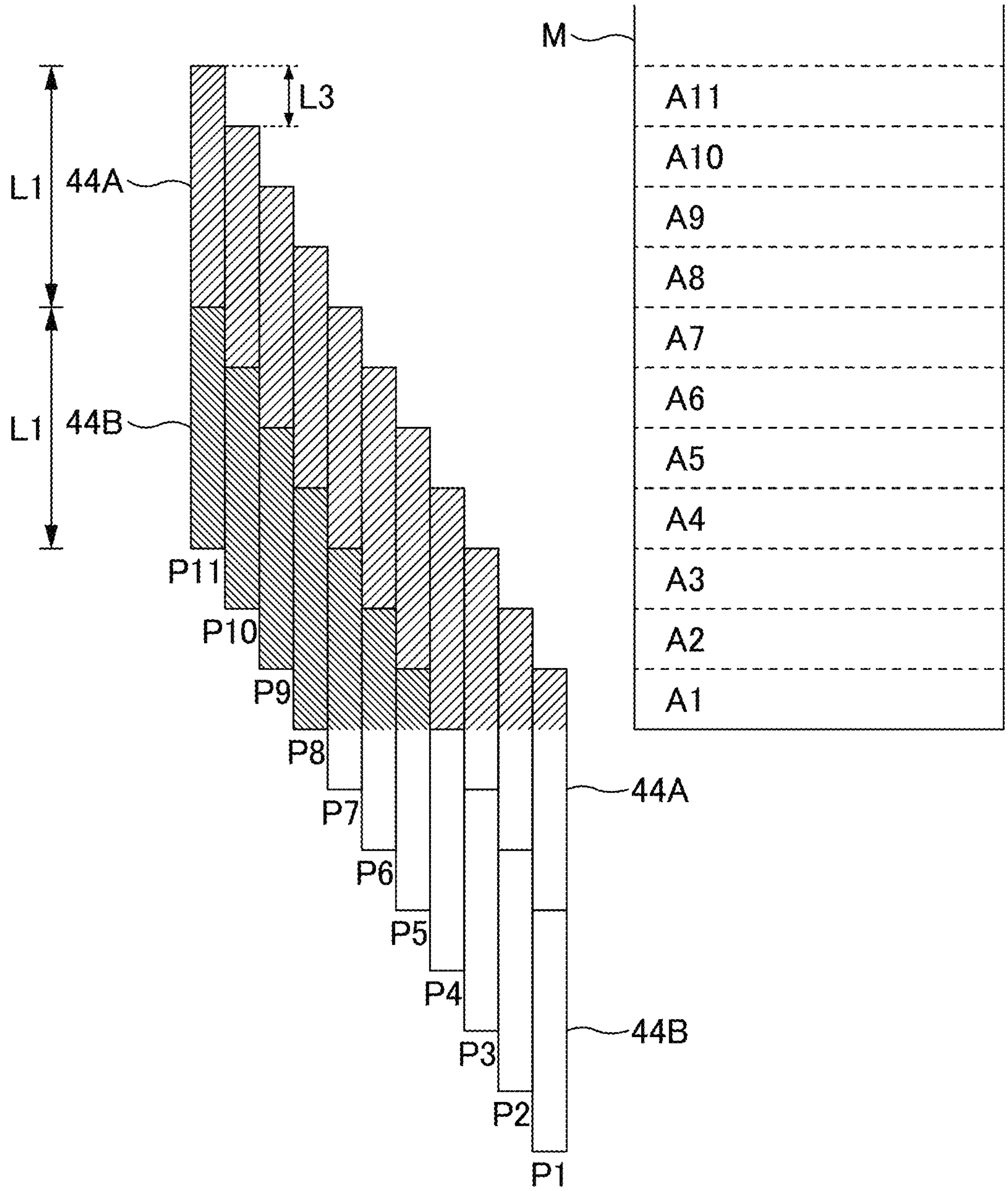
FIG. 7 is an explanatory diagram of a printing method (dot formation method) utilizing a processing liquid nozzle array 44A and an ink nozzle array 44B.

FIG. 7 is an explanatory diagram of a printing method (dot formation method) using a processing liquid nozzle array 44A and an ink nozzle array 44B. The drawing illustrates a positional relationship of ink nozzle array lines 44B and the processing liquid nozzle arrays 44A in the passes 1 to 11 with respect to the medium M. As described above, the processing liquid nozzle array 44A is arranged on the upstream side in the direction of conveyance with respect to the ink nozzle array 44B. Here, positions in the scanning directions of processing liquid nozzle arrays 44A and ink nozzle arrays 44B are aligned for simpler illustration.

In the area A1, all of the processing liquid dots are formed with four passes (passes 1 to 4), and all of the ink dots are formed with four passes (passes 5 to 8). In the same way, in the areas A2 to A4, all of the processing liquid dots are formed with four passes, and all of the ink dots are formed with four passes. In the area A5, all of the processing liquid dots are formed with four passes (passes 5 to 8), and approximately ¾ of the ink dots are formed with three passes (passes 9 to 11). Note that, in the pass 12, which is not illustrated in the drawing, the processing liquid nozzle array 44A forms the processing liquid dots in the areas A9 to A12 (A12 is not illustrated), and the ink nozzle array 44B forms the ink dots in the areas A5 to A8, which results in all of the ink dots to be formed in the area A5 being formed.

In the dot formation method illustrated in FIG. 7, the ink dot is formed with a pass immediately after the processing liquid dot is formed with a certain pass. For example, focusing on the area A1 in FIG. 7, the processing liquid dots are formed in the area A1 by the pass 4, and thereafter the ink dots are formed in the area A1 by the pass 5, which is the pass immediately after the pass 4. However, according to such a printing method, the ink (second liquid) is applied to the processing liquid (first liquid) that has just been applied onto the medium M, and thus the ink dots may be smeared, and the image quality of the printed image may be degraded.

Figure 8:
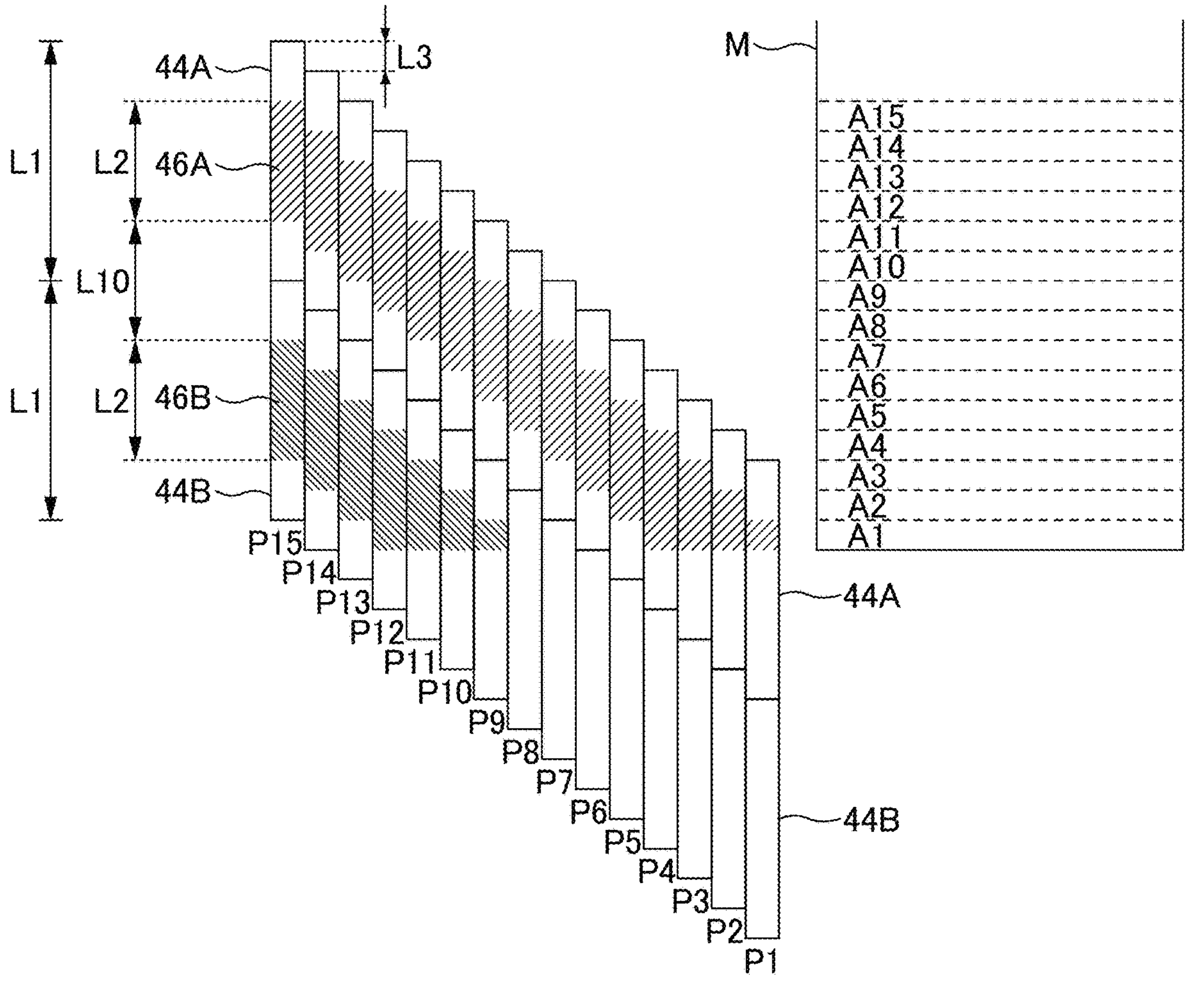
FIG. 8 is an explanatory diagram of a dot formation method with a drying period being set.

FIG. 8 is an explanatory diagram of a dot formation method in which a drying period is set. The drawing illustrates a positional relationship of the processing liquid nozzle arrays 44A and the ink nozzle arrays 44B in the passes 1 to 15 with respect to the medium M.

Among the rectangular-shaped nozzle arrays in the drawing, the hatched ranges indicate the ranges of use 46 (46A, 46B), and the ranges without hatching indicate the ranges of non-use. Here, the range of use 46 (46A, 46B) is located in the center of the nozzle array in the direction of conveyance, and the range of non-use is located on both end portions (upstream end and downstream end) of the nozzle array in the direction of conveyance. In order to make it possible adjust the interval between the range of use 46A and the range of use 46B as described later, it is preferable that the range of use 46 (46A, 46B) is disposed in the central portion of the nozzle array in the direction of conveyance, and the ranges of non-use are disposed in the both end portions (upstream end and downstream end) of the nozzle array in the direction of conveyance. However, the range of use 46 (46A, 46B) does not have to be disposed in the central portion of the nozzle array in the direction of conveyance. The range of use 46 (46A, 46B) may be disposed in the end portion (upstream end or downstream end) of the nozzle array in the direction of conveyance. Here, the length of the processing liquid nozzle array 44A is L1, and the length of the range of use 46A of the processing liquid nozzle array 44A is L2, that is half of the length L1. Further, the length of the ink nozzle array 44B is L1, and the length of the range of use 46B of the ink nozzle array 44B is L2, that is half of the length L1. The amount of conveyance L3 during the conveying operation is approximately ¼ of the length L2 (the length of the range of use of the nozzle array 44 in the direction of conveyance). Note that the width in the direction of conveyance of each of the areas (A1 to A15) in the drawing corresponds to the length L3.

The controller 70 arranges one or more non-use nozzles between the range of use 46A of the processing liquid nozzle array 44A and the range of use 46B of the ink nozzle array 44B, to thereby create an interval between the range of use 46A of the processing liquid nozzle array 44A and the range of use 46B of the ink nozzle array 44B. With the nozzle in the end portion on the downstream side in the direction of conveyance of the processing liquid nozzle array 44A not being used, and the nozzle in the end portion on the upstream side in the direction of conveyance of the ink nozzle array 44B not being used, an interval is created between the range of use 46A of the processing liquid nozzle array 44A and the range of use 46B of the ink nozzle array 44B. Here, a length L10 between the range of use 46A of the processing liquid nozzle array 44A and the range of use 46B of the ink nozzle array 44B in the direction of conveyance corresponds to the amount of conveyance of 4 times of the conveying operation.

The controller 70 repeats the pass with an interval between the range of use 46A of the processing liquid nozzle array 44A and the range of use 46B of the ink nozzle array 44B, and the conveying operation, alternately. This makes it possible to form the ink dots, after a lapse of the drying period of the processing liquid dots formed with a certain pass. For example, focusing on the area A1 in FIG. 8, the processing liquid dots are formed in the area A1 by the pass 4, and then the drying period corresponding to four passes (pass 5 to pass 8) has elapsed, and the ink dots are formed in the area A1 by the pass 9, which is the pass after the drying period. In this way, with an interval being created between the range of use 46*a* of the processing liquid nozzle array 44A and the range of use 46B of the ink nozzle array 44B, it is possible to set a drying period for the processing liquid applied to the medium M, thereby being able to restrain smearing of ink dots.

If the drying period of the processing liquid is too short, then ink dots may be likely to smear, to thereby degrade the quality of printed image. On the other hand, if the drying period of the processing liquid is too long, then the processing liquid applied onto the medium M coagulates and becomes non-uniform, which may degrade the quality of the printed image formed thereupon. Thus, the drying period of the processing liquid needs to be an appropriate length.

Meanwhile, the appropriate drying period for the processing liquid varies depending on the environment. For example, when the temperature is high or the humidity is low, the processing liquid dries easily. Accordingly, the drying period of the processing liquid should be short. On the other hand, when the temperature is low or the humidity is high, the drying period of the processing liquid should be longer.

Accordingly, the controller 70 adjusts the interval between the range of use 46A of the processing liquid nozzle array 44A and the range of use 46B of the ink nozzle array 44B, to thereby control the drying period of the processing liquid, as described below. Additionally, when adjusting the interval between the range of use 46A of the processing liquid nozzle array 44A and the range of use 46B of the ink nozzle array 44B, the controller 70 maintains the length of the range of use 46A in the processing liquid nozzle array 44A in the direction of conveyance and the length of the range of use 46B in the ink nozzle array 44B in the direction of conveyance. In other words, the controller maintains the amount of conveyance during the conveying operation. This can keep the length of each area (each of areas A1 to A15 in FIG. 8) in the direction of conveyance the same before and after the change of the drying period, to thereby restrain variations in the image quality.

Figure 9:
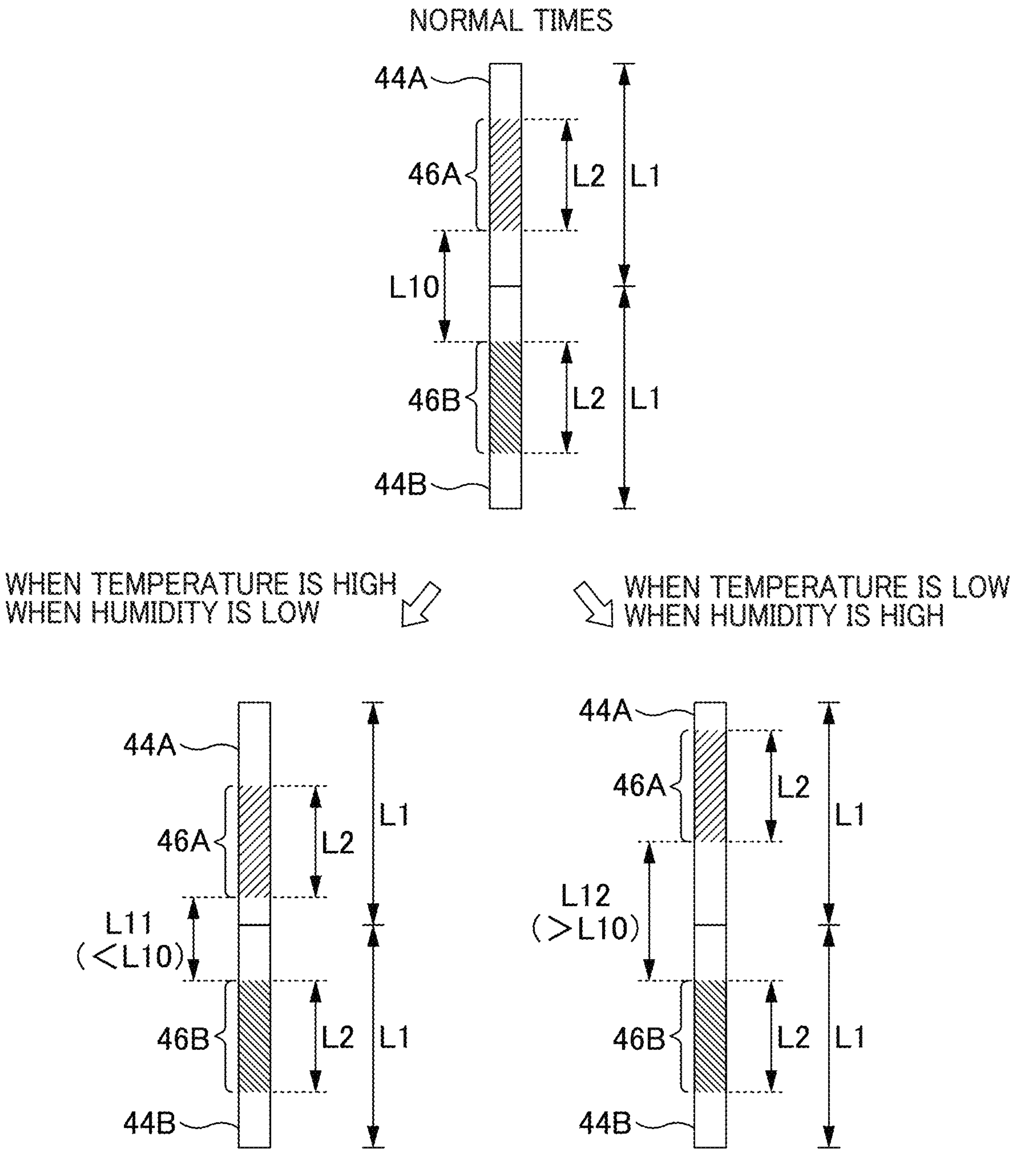
FIG. 9 is an explanatory diagram illustrating adjustment of an interval between a range of use 46A of a processing liquid nozzle array 44A and a range of use 46B of an ink nozzle array 44B.

FIG. 9 is an explanatory diagram illustrating the adjustment of the interval between the range of use 46A of the processing liquid nozzle array 44A and the range of use 46B of the ink nozzle array 44B.

As described above, the lengths of the processing liquid nozzle array 44A and the ink nozzle array 44B in the direction of conveyance is L1. Each of the lengths of the range of use 46A of the processing liquid nozzle array 44A and the range of use 46B of the ink nozzle array 44B in the direction of conveyance, that is L2, is half of the length L1. As illustrated in the upper diagram in FIG. 9, in normal times (before change in the drying period), the length L10 between the range of use 46A of the processing liquid nozzle array 44A and the range of use 46B of the ink nozzle array 44B in the direction of conveyance corresponds to the amount of conveyance of 4 times of the conveying operation. As illustrated in the upper diagram in FIG. 9, the controller 70 repeats the pass in which the interval L10 is created between the range of use 46A of the processing liquid nozzle array 44A and the range of use 46B of the ink nozzle array 44B, and the conveying operation with the amount of conveyance L3, alternately. Accordingly, in normal times, such multi-pass printing as illustrated in FIG. 8 is performed, and the drying period corresponding to the four passes (pass 5 to pass 8) can be set.

Figure 10:
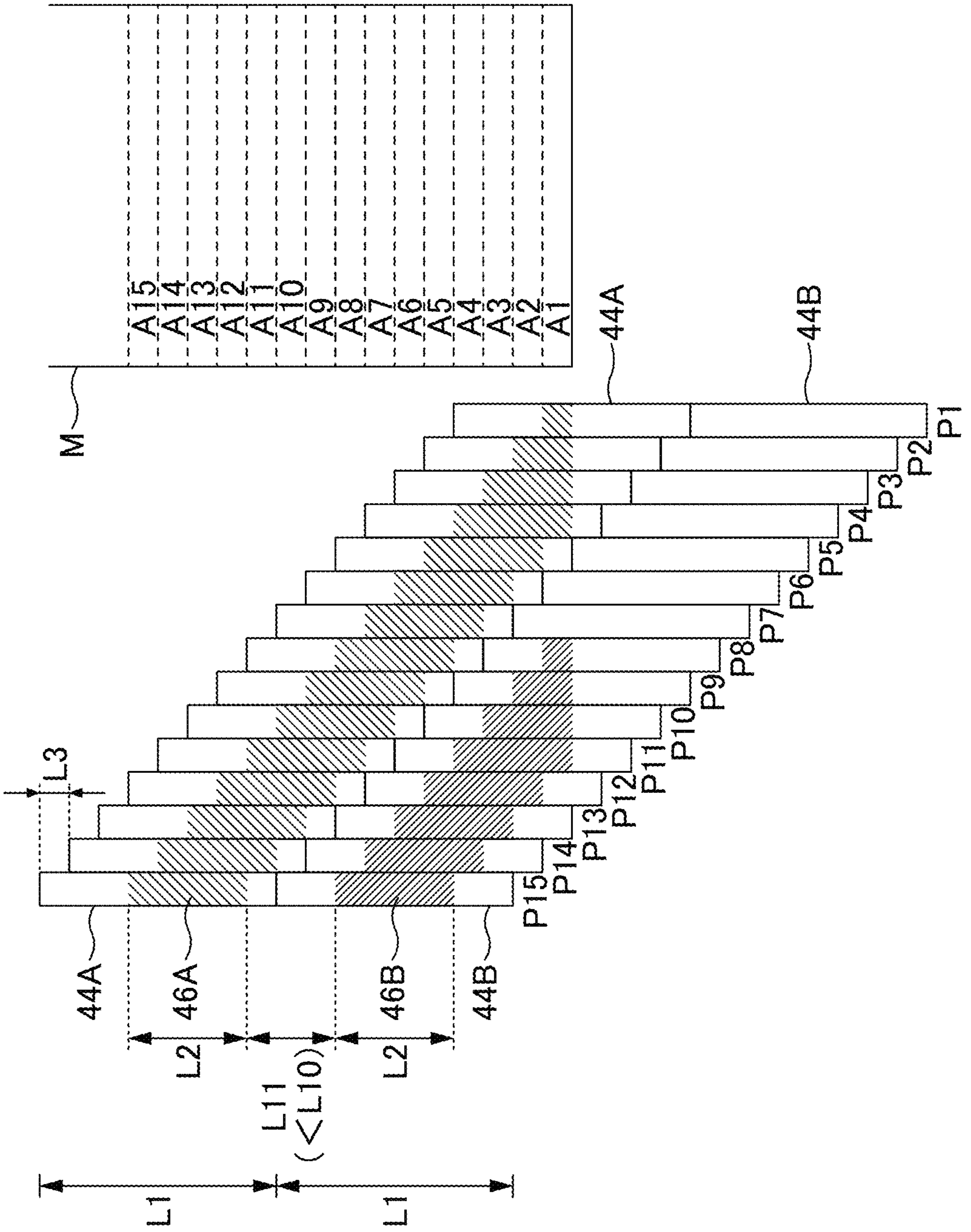
FIG. 10 is an explanatory diagram of a dot formation method in the case where temperature is high or humidity is low.

FIG. 10 is an explanatory diagram of a dot formation method in the case where temperature is high or humidity is low. In other words, FIG. 10 is an explanatory diagram of the dot formation method to shorten the drying period.

As illustrated in the lower left diagram in FIG. 9 and in FIG. 10, when the temperature is high or the humidity is low (when the measurement result of the sensor 61 is higher than a first reference temperature, or when the measurement result of the sensor 61 is lower than a first reference humidity), the controller 70 reduces the interval between the range of use 46A of the processing liquid nozzle array 44A and the range of use 46B of the ink nozzle array 44B. For example, the controller 70 changes the interval between the range of use 46A of the processing liquid nozzle array 44A and the range of use 46B of the ink nozzle array 44B, from the length L10 corresponding to the amount of conveyance of 4 times of the conveying operation, to a length L11 corresponding to the amount of conveyance of 3 times of conveying operation. On the other hand, the controller 70 sets the lengths of the processing liquid nozzle array 44A and the ink nozzle array 44B in the direction of conveyance to L2, and maintains the same lengths as in normal times. Further, the controller 70 sets the amount of conveyance during the conveying operation to L3 (approximately ¼ of the length L2), to maintain the same amount of conveyance as in normal times. Then, the controller 70, as illustrated in the lower left diagram in FIG. 9, repeats the pass in which the interval L11 is created between the range of use 46A of the processing liquid nozzle array 44A and the range of use 46B of the ink nozzle array 44B, and the conveying operation with the amount of conveyance L3, alternately. Accordingly, the multi-pass printing illustrated in FIG. 10 is performed.

Focusing on the area A1 in FIG. 10, after the processing liquid dots are formed in the area A1 by the pass 4, the period corresponding to three passes (pass 5 to pass 7) is a drying period during which no dot is formed in the area A1. Thereafter, the ink dots are formed in the area A1 by the pass 8, which is the pass after the drying period. In this way, by the dot formation method illustrated in FIG. 10, the drying period corresponding to three passes can be set. That is, by the dot formation method illustrated in FIG. 10, the drying period results in being reduced, by a single pass, as compared to the case of the dot formation method illustrated in FIG. 8. Meanwhile, each of the lengths L2 (the lengths of the range of use 46A of the processing liquid nozzle array 44A and the range of use 46B of the ink nozzle array 44B in the direction of conveyance) is maintained at the length in normal times. In other words, the amount of conveyance L3 during the conveying operation is maintained at the length in normal times. This can keep the length in the direction of conveyance of each area (each of the areas A1 to A15 in FIGS. 8 and 10) the same before and after change in the drying period, thereby being able to restrain variations in the image quality before and after the drying period.

The controller 70 may set the interval between the range of use 46A of the processing liquid nozzle array 44A and the range of use 46B of the ink nozzle array 44B to a length further shorter than the length L11, when the temperature increases higher or the humidity decreases lower. Accordingly, the drying period can be further shortened with respect to the drying period by the dot formation method illustrated in FIG. 10.

Figure 11:
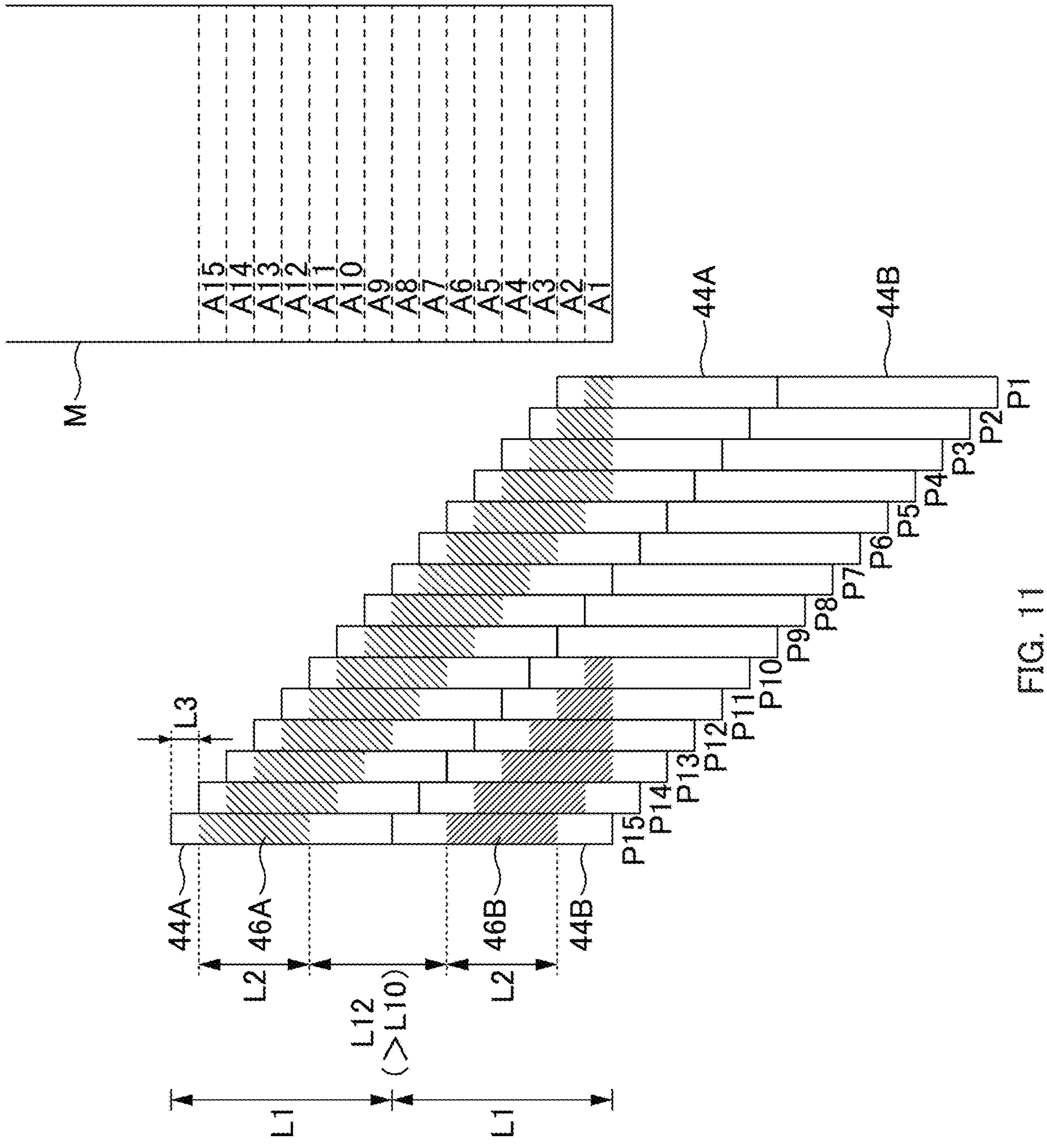
FIG. 11 is an explanatory diagram of a dot formation method in the case where temperature is low or humidity is high.

FIG. 11 is an explanatory diagram of the dot formation method in the case where temperature is low or humidity is high. In other words, FIG. 11 is the explanatory diagram of the dot formation method to lengthen the drying period.

As illustrated in the lower right diagram in FIG. 9 and in FIG. 11, when the temperature is low or the humidity is high (when the measurement result of the sensor 61 is lower than a second reference temperature, or when the measurement result of the sensor 61 is higher than a second reference humidity), the controller 70 increases the interval between the range of use 46A of the processing liquid nozzle array 44A and the range of use 46B of the ink nozzle array 44B. For example, the controller 70 changes the interval between the range of use 46A of the processing liquid nozzle array 44A and the range of use 46B of the ink nozzle array 44B, from the length L10 corresponding to the amount of conveyance of 4 times of the conveying operation to the length L12 corresponding to the amount of conveyance of 5 times of the conveying operation. Meanwhile, the controller 70 sets the lengths of the ink nozzle array 44B and the processing liquid nozzle array 44A in the direction of conveyance to L2, and maintains the same lengths as in normal times. Further, the controller 70 sets the amount of conveyance during the conveying operation to L3 (approximately ¼ of the length L2), and maintains the same amount of conveyance as in normal times. Then, the controller 70, as illustrated in the lower right diagram of FIG. 9, repeats the pass in which the interval L12 is created between the range of use 46A of the processing liquid nozzle array 44A and the range of use 46B of the ink nozzle array 44B, and the conveying operation with the amount of conveyance L3, alternately. Accordingly, the multi-pass printing illustrated in FIG. 11 is performed.

Focusing on the area A1 in FIG. 11, after the processing liquid dots are formed in the area A1 by the pass 4, the period corresponding to five passes (pass 5 to pass 9) is a drying period during which no dot is formed in the area A1. Thereafter, the ink dots are formed in the area A1 by the pass 10, which is the pass after the drying period. In this way, by the dot formation method illustrated in FIG. 11, the drying period corresponding to five passes can be set. That is, by the dot formation method illustrated in FIG. 11, the drying period results in being increased, by a single pass, as compared to the case of the dot formation method illustrated in FIG. 8. Meanwhile, each of the lengths L2 (the lengths of the range of use 46A of the processing liquid nozzle array 44A and the range of use 46B of the ink nozzle array 44B in the direction of conveyance) is maintained at the length in normal times. In other words, the amount of conveyance L3 during the conveying operation is maintained at the length in normal times. This can keep the length of each area (each of the areas A1 to A15 in FIGS. 8 and 11) in the direction of conveyance the same before and after change in the drying period, thereby being able to restrain variations in the image quality before and after the drying period.

Note that the controller 70 may set the interval between the range of use 46A of the processing liquid nozzle array 44A and the range of use 46B of the ink nozzle array 44B to a length further longer than the length L12, when the temperature decreases lower or the humidity increases higher. Accordingly, the drying period can be further lengthened with respect to the drying period by the dot formation method illustrated in FIG. 11.

In the above explanation, the controller 70 changes the interval between the range of use 46A of the processing liquid nozzle array 44A and the range of use 46B of the ink nozzle array 44B by changing the range of use 46A of the processing liquid nozzle array 44A. However, the interval between the range of use 46A of the processing liquid nozzle array 44A and the range of use 46B of the ink nozzle array 44B can be changed by changing the range of use 46B of the ink nozzle array 44B. In this case as well, when adjusting the interval between the range of use 46A of the processing liquid nozzle array 44A and the range of use 46B of the ink nozzle array 44B, the controller 70 maintains the length of the range of use 46A in the processing liquid nozzle array 44A in the direction of conveyance and the length of the range of use 46B in the ink nozzle array 44B in the direction of conveyance. In other words, the controller maintains the amount of conveyance during the conveying operation. This can keep the length of each area (each of areas A1 to A15 in FIG. 8) in the direction of conveyance the same before and after change in the drying period, thereby being able to restrain variations in the image quality.

In the printing method illustrated in FIGS. 8, 10, and 11, the controller 70 obtains the measurement result of the sensor 61 before printing starts, and sets the interval between the range of use 46A of the processing liquid nozzle array 44A and the range of use 46B of the ink nozzle array 44B, based on the measurement result of the sensor 61. Thus, in the printing method illustrated in FIGS. 8, 10, and 11, the interval between the range of use 46A of the processing liquid nozzle array 44A and the range of use 46B of the ink nozzle array 44B, in each pass during printing, is constant. However, the controller 70 may obtain the measurement result of the sensor 61 during printing, and change the interval between the range of use 46A of the processing liquid nozzle array 44A and the range of use 46B of the ink nozzle array 44B, based on the measurement result of the sensor 61 during printing. Likewise, in the case where a user operates the input part (input screen, input button, etc.), to thereby input the information on at least one of the temperature or the humidity to the printer 1 during printing as well, the controller 70 may change the interval between the range of use 46A of the processing liquid nozzle array 44A and the range of use 46B of the ink nozzle array 44B, based on the information on at least one of the temperature or the humidity inputted to the input part (corresponding to the receiver 60). Likewise, in the case where the controller 70 controls the temperature of the heating device 50 (heater 51, air blower 52, etc.) during printing as well, the controller 70 may output a control signal to the signal receiver (corresponding to the receiver 60), and change the interval between the range of use 46A of the processing liquid nozzle array 44A and the range of use 46B of the ink nozzle array 44B, based on the information on the temperature indicated by the control signal.

Figure 12:
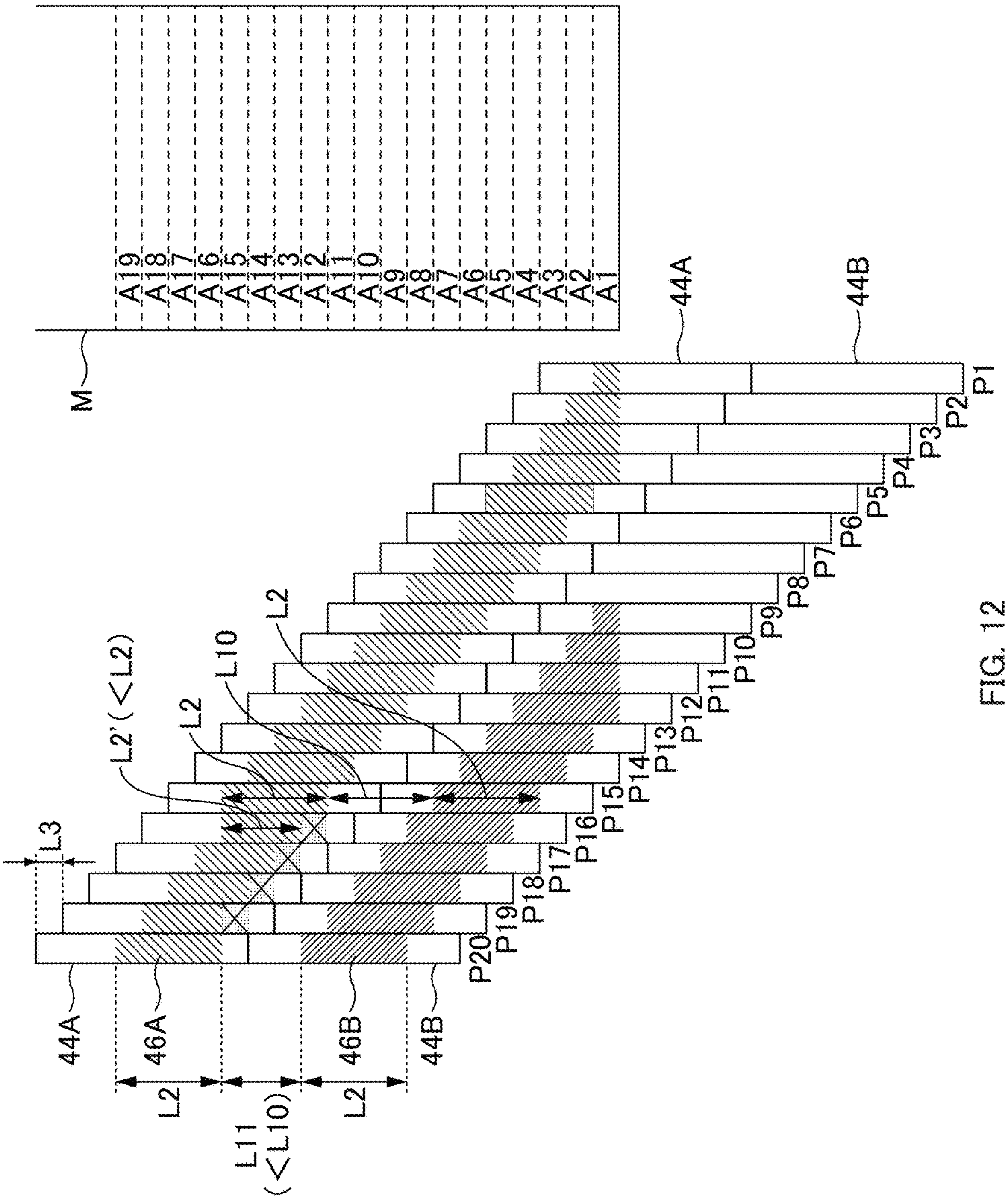
FIG. 12 is an explanatory diagram of a dot formation method in the case where temperature increases or humidity decreases during printing.

FIG. 12 is an explanatory diagram of a dot formation method in the case where the temperature increases or the humidity decreases during printing. In other words, FIG. 12 is an explanatory diagram of the dot formation method to shorten the drying period during printing.

The pass 1 to the pass 15 illustrated in FIG. 12 are the same as the pass 1 to the pass 15 in FIG. 8. It is assumed here that the measurement result of the sensor 61 becomes higher than the first reference temperature or the measurement result of the sensor 61 becomes lower than the first reference humidity, before the pass 16.

When the measurement result of the sensor 61 is higher than the first reference temperature, or when the measurement result of the sensor 61 is lower than the first reference humidity, the controller 70 reduces the interval between the range of use 46A of the processing liquid nozzle array 44A and the range of use 46B of the ink nozzle array 44B. However, as to the pass 16, as illustrated in the lower left drawing in FIG. 9, if the interval between the range of use 46A of the processing liquid nozzle array 44A and the range of use 46B of the ink nozzle array 44B is set to the length L11 corresponding to the amount of conveyance of 3 times of the conveying operation, the amount of processing liquid to be applied to the area A12 will be excessive, because the processing liquid will be additionally applied to the area A12 with the pass 16 although all the processing liquid dots have already been formed in the area A12 with four passes (pass 12 to pass 15).

Thus, the controller 70 temporarily performs a shift pass (pass 16 to pass 19 in FIG. 12) before performing the pass (pass 20 in FIG. 12) in which the range of use 46A of the processing liquid nozzle array 44A has been changed as illustrated in the lower left diagram in FIG. 9. In the shift pass, the controller 70 temporarily changes the length of the range of use 46 of the nozzle array 44 in the direction of conveyance from the length L2 in normal times to a length L2'. Specifically, in the shift pass, the controller 70 changes, into the range of non-use, the range corresponding to ¼ on the downstream side in the direction of conveyance in the range of use 46A of the processing liquid nozzle array 44A illustrated in lower left diagram in FIG. 9 (the range corresponding to the amount of conveyance of a single time of the conveying operation is changed into the range of non-use; the range marked with X in FIG. 12). In the shift pass, the interval between the range of use 46A of the processing liquid nozzle array 44A and the range of use 46B of the ink nozzle array 44B is the length L10 corresponding to the amount of conveyance of 4 times of conveying operation, as in normal times. In the shift pass (pass 16 to pass 19 in FIG. 12), the length of the range of use 46A of the processing liquid nozzle array 44A in the direction of conveyance, that is L2', is shorter than the length L2 (the length of the range of use 46A of the processing liquid nozzle array 44A in the direction of conveyance in the passes other than the shift passes). This can restrain excessive application of the processing liquid to the medium M.

After repeating such shift pass and conveying operation 4 times, the controller 70 sets the interval between the range of use 46A of the processing liquid nozzle array 44A and the range of use 46B of the ink nozzle array, to the length L11 corresponding to the amount of conveyance of 3 times of the conveying operation, as illustrated in the lower left diagram in FIG. 9. Further, the controller 70, as illustrated in the lower left diagram in FIG. 9, returns the length of the range of use 46A of the processing liquid nozzle array 44A in the direction of conveyance, to L2. As a result, the length of the range of use 46A of the processing liquid nozzle array 44A in the direction of conveyance in the passes (pass 20 and later) following the shift passes is maintained at the length of the range of use 46A of the processing liquid nozzle array 44A in the direction of conveyance in the passes (passes before pass 15 in FIG. 12) before the shift passes as L2. Then, the controller 70, as illustrated in the lower left diagram in FIG. 9, repeats the pass in which the interval L11 is created between the range of use 46A of the processing liquid nozzle array 44A and the range of use 46B of the ink nozzle array 44B (see the pass 20 in FIG. 12), and the conveying operation, alternately. This can shorten the drying period, thereby being able to adjust the drying period so as to be appropriate for the temperature and the humidity.

Even in the case where the temporal shift pass (pass 16 to pass 19 in FIG. 12) is performed, the controller 70 sets the amount of conveyance during the conveying operation to L3 (approximately ¼ of the length L2), and maintains the amount of conveyance at the same amount as in normal times. This can keep the length of each of the areas (each of the areas A1 to A19 in FIG. 12) in the direction of conveyance the same before and after change in the drying period, thereby being able to restrain variations in the image quality before and after change in drying period.

Figure 13:
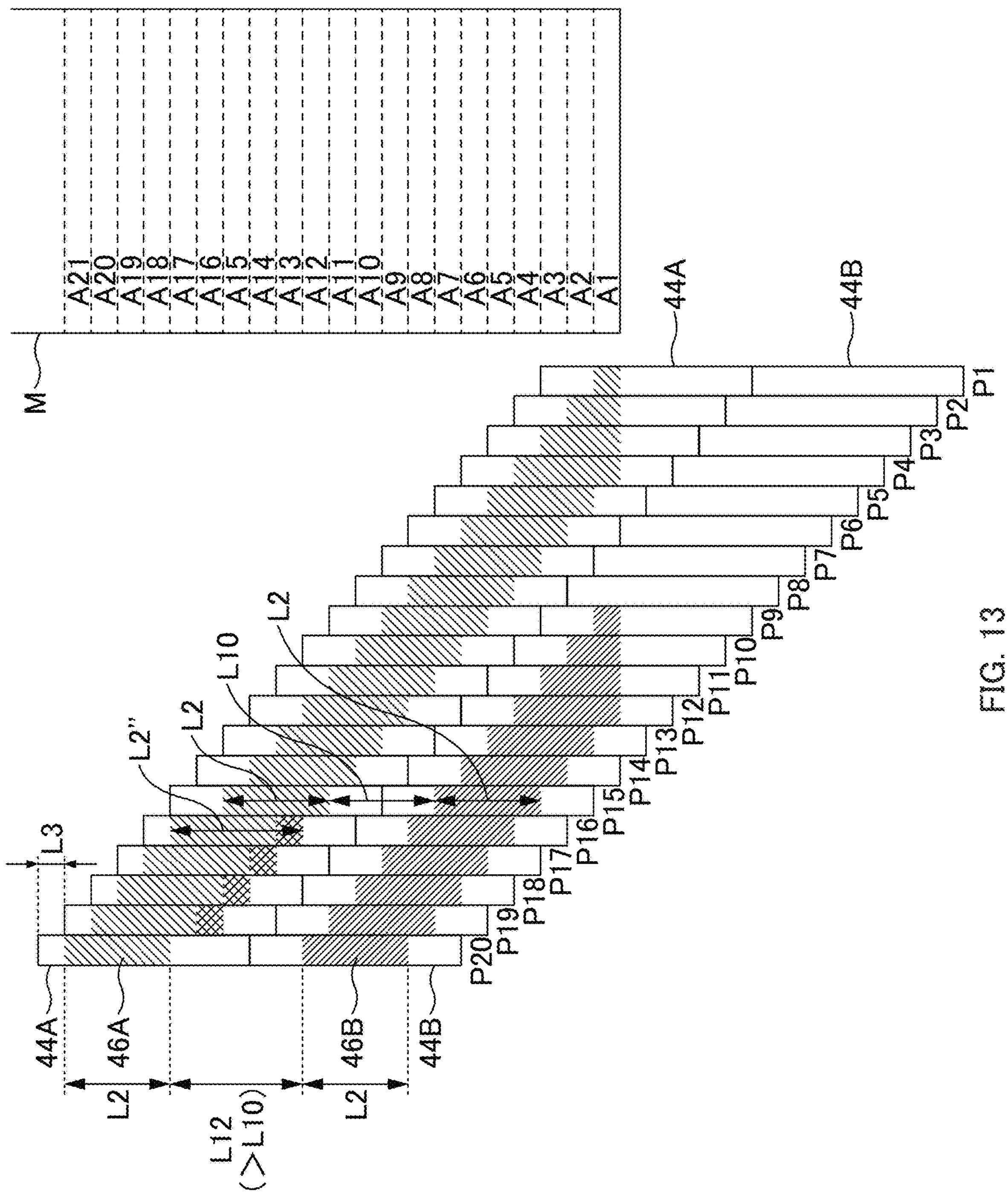
FIG. 13 is an explanatory diagram of a dot formation method in the case where temperature decreases or humidity increases during printing.

FIG. 13 is an explanatory diagram of a dot formation method in the case where the temperature decreases or the humidity increases during printing. In other words, FIG. 13 is an explanatory diagram of the dot formation method to lengthen the drying period during printing.

The pass 1 to the pass 15 illustrated in FIG. 13 are the same as the pass 1 to the pass 15 in FIG. 8. It is assumed here the measurement result of the sensor 61 becomes lower than the second reference temperature or the measurement result of the sensor 61 becomes higher than the second reference humidity, before the pass 16.

When the measurement result of the sensor 61 is lower than the second reference temperature, or when the measurement result of the sensor 61 is higher than the second reference humidity, the controller 70 increases the interval between the range of use 46A of the processing liquid nozzle array 44A and the range of use 46B of the ink nozzle array 44B. However, as to the pass 16, as illustrated in the lower right diagram in FIG. 9, if the interval between the range of use 46A of the processing liquid nozzle array 44A and the range of use 46B of the ink nozzle array 44B is set to the length L12 corresponding to the amount of conveyance of 5 times of the conveying operation, the amount of the processing liquid to be applied to the area A13 will be insufficient.

Thus, the controller 70 temporarily performs the shift pass (pass 16 to pass 19 in FIG. 13) before performing the pass (pass 20 in FIG. 13) in which the range of use 46A of the processing liquid nozzle array 44A has been changed as illustrated in the lower right diagram in FIG. 9. In the shift pass, the controller 70 temporarily changes the length of the range of use 46 of the nozzle array 44 in the direction of conveyance from the length L2 in normal times to the length L2''. Specifically, in the shift pass, the controller 70 changes, into the range of use 46A, the range corresponding to ¼ on the upstream side in the direction of conveyance in the range of non-use on the downstream side of the processing liquid nozzle array 44A illustrated in lower right diagram in FIG. 9 (the range corresponding to the amount of conveyance of a single time of the conveying operation is changed into the range of use 46A; the darkly hatched range in FIG. 13). In the shift pass, the interval between the range of use 46A of the processing liquid nozzle array 44A and the range of use 46B of the ink nozzle array 44B is the length L10 corresponding to the amount of conveyance of 4 times of the conveying operation, as in normal times. The length of the range of use 46A of the processing liquid nozzle array 44A in the direction of conveyance in the shift pass (pass 16 to pass 19 in FIG. 13), that is L2'', is longer than the length L2 (the length of the range of use 46A in the direction of conveyance before the shift pass). This can supplement the processing liquid to be applied to the medium M (this can prevent the insufficient amount of the processing liquid to be applied).

After repeating such shift pass and conveying operation 4 times, the controller 70 sets the interval between the range of use 46A of the processing liquid nozzle array 44A and the range of use 46B of the ink nozzle array 44B, to the length L12 corresponding to the amount of conveyance of 5 times of the conveying operation, as illustrated in the lower right diagram in FIG. 9. Further, the controller 70, as illustrated in the lower right diagram in FIG. 9, returns the length of the range of use 46A of the processing liquid nozzle array 44A in the direction of conveyance to L2. As a result, the length of the range of use 46A of the processing liquid nozzle array 44A in the direction of conveyance in the passes (pass 20 and later) following the shift pass is maintained at the length of the range of use 46A of the processing liquid nozzle array 44A in the direction of conveyance in the passes (passes before pass 15 in FIG. 13) before the shift pass as L2. Then, the controller 70, as illustrated in the lower right diagram in FIG. 9, repeats the pass in which the interval L12 is created between the range of use 46A of the processing liquid nozzle array 44A and the range of use 46B of the ink nozzle array 44B (see the pass 20 in FIG. 13), and the conveying operation, alternately. This can lengthen the drying period, thereby being able to adjust the drying period so as to be appropriate for the temperature and the humidity.

Even in the case where the temporal shift pass (pass 16 to pass 19 in FIG. 13) is performed, the controller 70 sets the amount of conveyance during the conveying operation to L3 (approximately ¼ of the length L2), and maintains the amount of conveyance at the same amount as in normal times. This can keep the length of each of the areas (each of the areas A1 to A19 in FIG. 13) in the direction of conveyance the same before and after change in the drying period, thereby being able to restrain variations in the image quality before and after change in the drying period.

Incidentally, in the case where the interval between the range of use 46A of the processing liquid nozzle array 44A and the range of use 46B of the ink nozzle array 44B is changed during printing as well, the range of use 46B of the ink nozzle array 44B may be changed instead of changing the range of use 46A of the processing liquid nozzle array 44A. However, if the range of use 46B of the ink nozzle array 44B is changed during printing, the image quality of the ink image 91B may become non-uniform. Accordingly, as illustrated in FIG. 9 to FIG. 11, in the case where the interval between the range of use 46A of the processing liquid nozzle array 44A and the range of use 46B of the ink nozzle array 44B is changed, the controller 70 should preferably change the interval between the range of use 46A of the processing liquid nozzle array 44A and the range of use 46B of the ink nozzle array 44B, by changing the range of use 46A of the processing liquid nozzle array 44A.

Figure 14B:
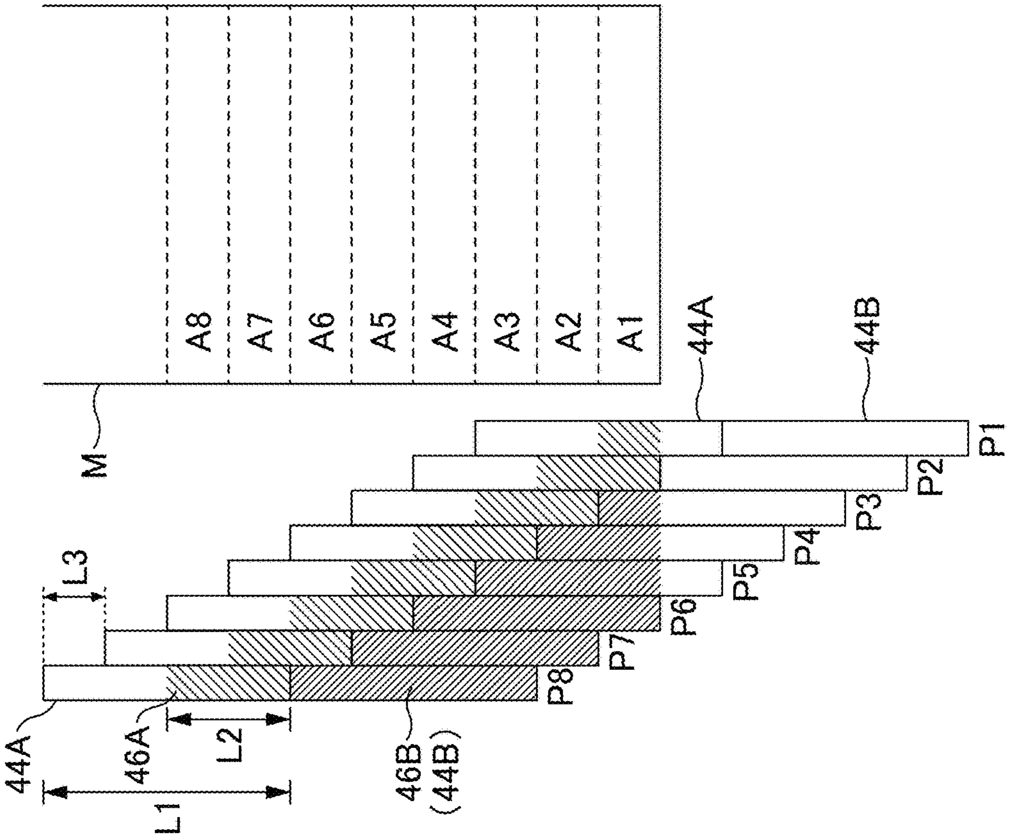
FIGS. 14A and 14B are explanatory diagrams of a first modification of a preferred embodiment of the present invention.
Figure 14A:
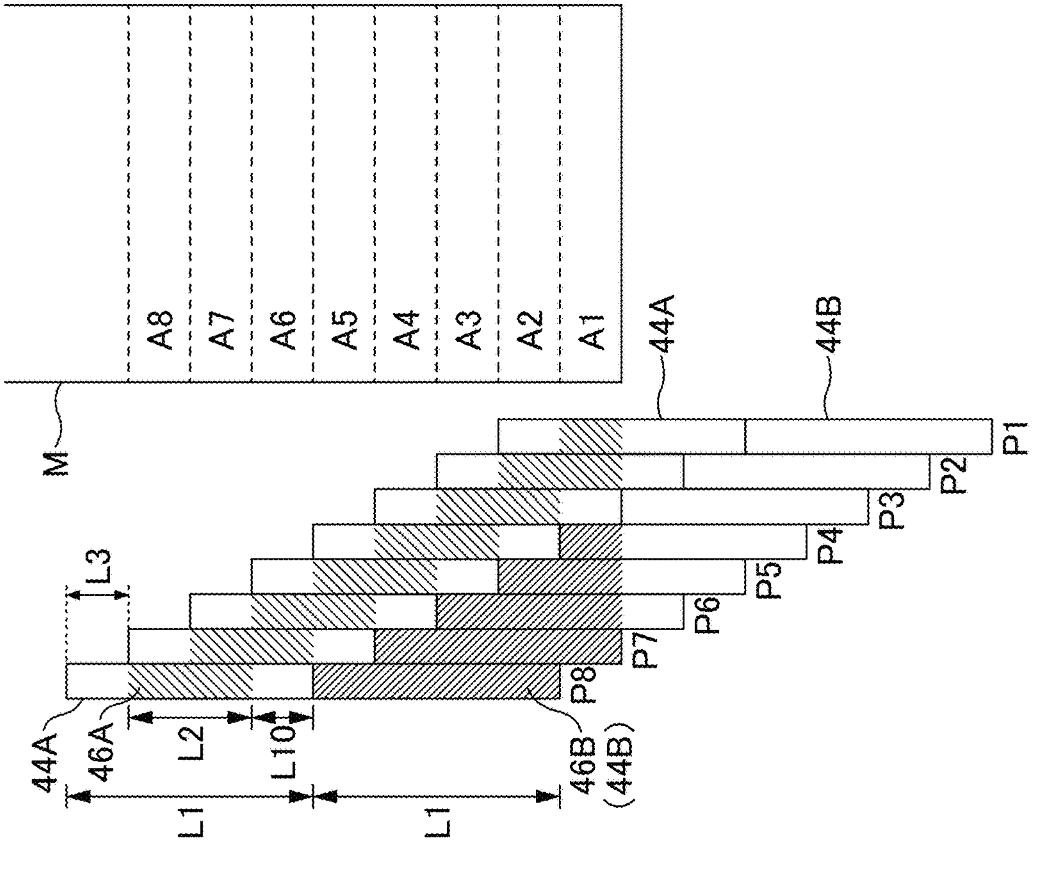

FIGS. 14A and 14B are explanatory diagrams of a first modification of a preferred embodiment of the present invention. FIG. 14A is an explanatory diagram of a dot formation method in normal times. FIG. 14B is an explanatory diagram of a dot formation method in the case where temperature increases or humidity decreases. Here, explanation of a dot formation method in the case where temperature decreases or humidity increases is omitted.

In the first modification, the length of the range of use 46A of the processing liquid nozzle array 44A in the direction of conveyance and the length of the range of use 46B of the ink nozzle array 44B in the direction of conveyance are different. Even if the length of the range of use 46A of the processing liquid nozzle array 44A in the direction of conveyance and the length of the range of use 46B of the ink nozzle array 44B in the direction of conveyance are not the same, the drying period can be adjusted by adjusting the interval between the range of use 46A of the processing liquid nozzle array 44A and the range of use 46B of the ink nozzle array 44B. In the first modification as well, when adjusting the interval between the range of use 46A of the processing liquid nozzle array 44A and the range of use 46B of the ink nozzle array 44B, the controller 70 maintains the length of the range of use 46A of the processing liquid nozzle array 44A in the direction of conveyance and the length of the range of use 46B of the ink nozzle array 44B in the direction of conveyance. In other words, the controller maintains the amount of conveyance during the conveying operation. This can keep the length of each area (each of areas A1 to A15 in FIG. 8) in the direction of conveyance the same before and after change in the drying period, thereby being able to restrain variations in the image quality.

In the first modification, the processing liquid image 91A is formed with two-pass printing, and the ink image 91B is formed with four-pass printing. As illustrated in FIG. 2, the number of the processing liquid nozzle arrays 44A (4 arrays) is larger than the number of the ink nozzle arrays 44B (1 array for each color). Thus, the number of the passes to complete the processing liquid image 91A can be less than the number of the passes to complete the ink image 91B. As illustrated in the first modification, even in the case where the processing liquid image 91A and the ink image 91B are formed with the multi-pass printing, the number of the passes to complete the processing liquid image 91A in each area on the medium M and the number of the passes to complete the ink image 91B in each area on the medium M may be different.

Figure 15B:
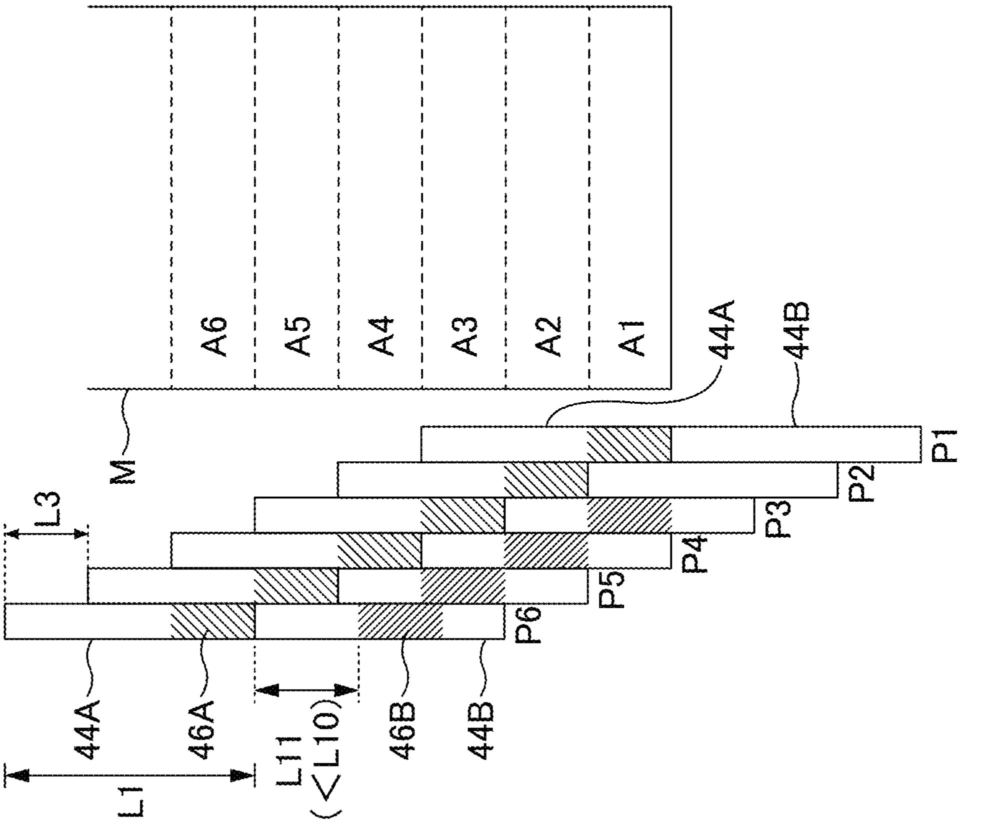
FIGS. 15A and 15B are explanatory diagrams of a second modification of a preferred embodiment of the present invention.
Figure 15A:
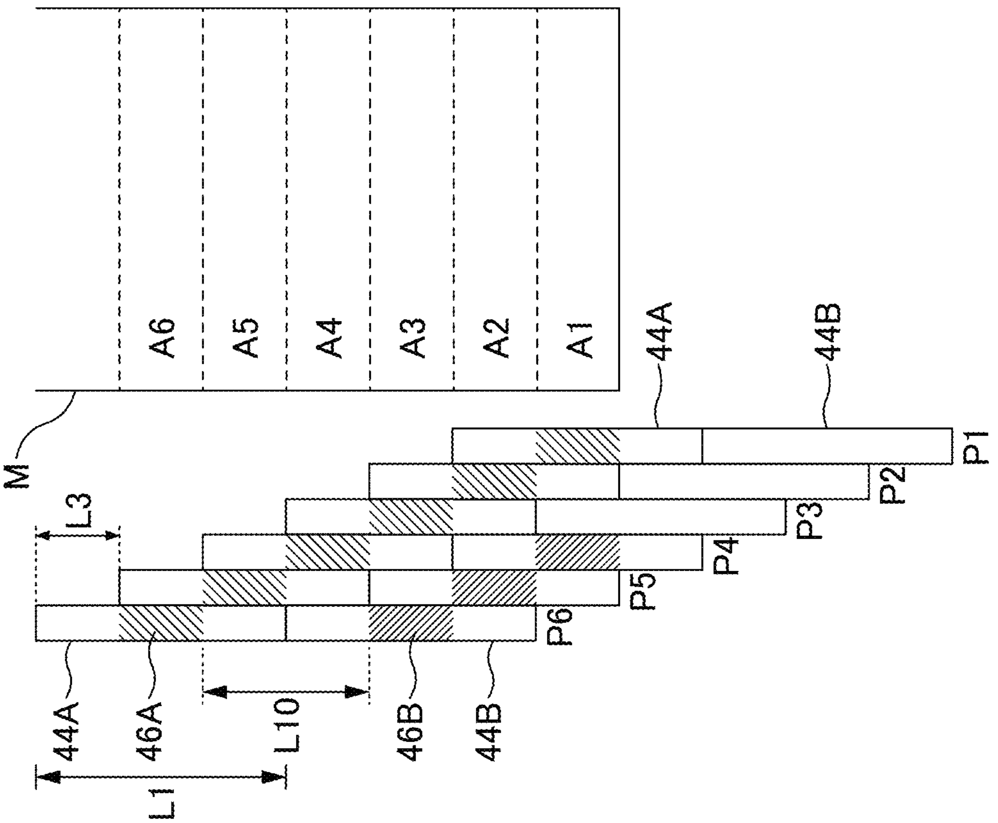

FIGS. 15A and 15B are explanatory diagrams of a second modification of a preferred embodiment of the present invention. FIG. 15A is an explanatory diagram of a dot formation method in normal times. FIG. 15B is an explanatory diagram of a dot formation method in the case where temperature increases or humidity decreases.

In the second modification illustrated in FIGS. 15A and the 15B, the dots to be formed in each area is completed with a single pass. As illustrated in this second modification, even if the multi-pass printing is not performed, the drying period can be adjusted by changing the interval between the range of use 46A of the processing liquid nozzle array 44A and the range of use 46B of the ink nozzle array 44B. Further, in the second modification as well, when adjusting the interval between the range of use 46A of the processing liquid nozzle array 44A and the range of use 46B of the ink nozzle array 44B, the controller 70 maintains the length of each of the range of use 46A of the processing liquid nozzle array 44A and the range of use 46B of the ink nozzle array 44B in the direction of conveyance. In other words, the controller maintains the amount of conveyance during the conveying operation. This can keep the length of each area (each of areas A1 to A15 in FIG. 8) in the direction of conveyance the same before and after change in the drying period, thereby being able to restrain variations in the image quality.

Figure 16A:
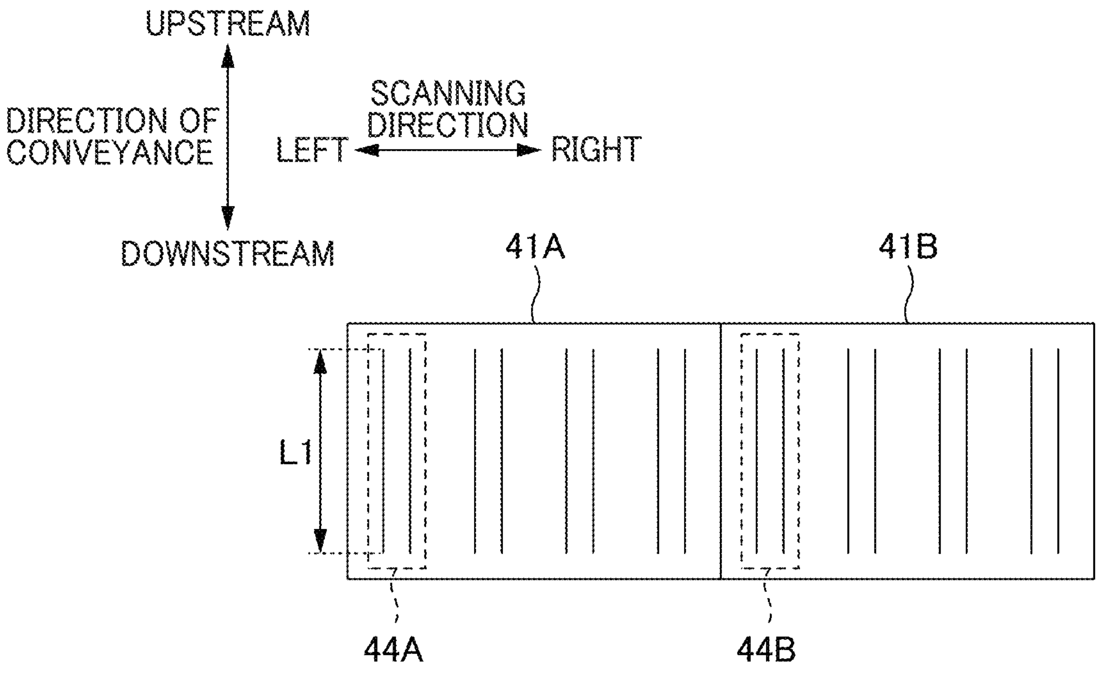
FIGS. 16A and 16B are explanatory diagrams of a third modification of a preferred embodiment of the present invention.
Figure 16B:
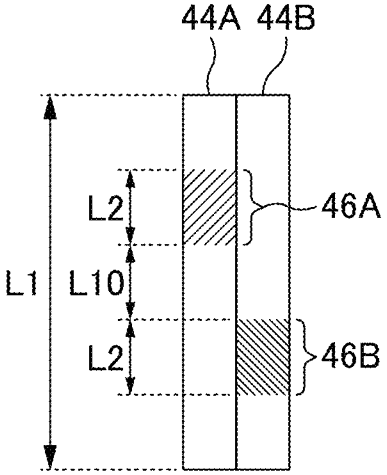

FIGS. 16A and 16B are explanatory diagrams of a third modification of a preferred embodiment of the present invention. FIG. 16A is an explanatory diagram of a configuration of a head unit 40. FIG. 16B is an explanatory diagram of a range of use 46A of a processing liquid nozzle array 44A and a range of use 46B of an ink nozzle array 44B.

In the third modification, the processing liquid nozzle array 44A and the ink nozzle array 44B are arranged in the scanning direction. Even if the processing liquid nozzle array 44A is not arranged on the upstream side in the direction of conveyance with respect to the ink nozzle array 44B, as such, the drying period can be adjusted by changing the interval L10 between the range of use 46A of the processing liquid nozzle array 44A and the range of use 46B of the ink nozzle array 44B. However, as can be understood from the comparison between FIG. 9 and FIG. 16B, with the arrangement in which the processing liquid nozzle array 44A is disposed on the upstream side in the direction of conveyance with respect to the ink nozzle array 44B as illustrated in FIG. 9, it is possible to reduce the number of nozzles that are not used, thereby being able to utilize the nozzles more effectively. Note that, in the case where the processing liquid nozzle array 44A is arranged on the upstream side in the direction of conveyance with respect to the ink nozzle array 44B, a portion of the processing liquid nozzles 45A on the downstream side in the direction of conveyance of the processing liquid nozzle array 44A and a portion of the ink nozzles 45B on the upstream side in the direction of conveyance of the ink nozzle array 44B may be arranged side by side in the scanning direction.

In the above description, the controller 70 controls the ranges of non-use of the processing liquid nozzle array 44A and the ink nozzle array 44B, to thereby change the interval L10 between the range of use 46A of the processing liquid nozzle array 44A and the range of use 46B of the ink nozzle array 44B. However, a method of changing the interval L10 between the range of use 46A of the processing liquid nozzle array 44A and the range of use 46B of the ink nozzle array 44B is not limited to this. For example, the interval L10 between the range of use 46A of the processing liquid nozzle array 44A and the range of use 46B of the ink nozzle array 44B may be changed, with at least one of the processing liquid head 41A or the ink head 41B being configured to be movable in the direction of conveyance and the controller 70 controlling the driving part based on the measurement result of the sensor 61, to thereby change the position of the head 41 in the direction of conveyance. Such a configuration can also reduce the number of the nozzles that are not used, thereby being able to utilize the nozzles effectively. However, such a configuration in which the ranges of non-use of the processing liquid nozzle array 44A and the ink nozzle array 44B are controlled is more preferable since it can simplify a configuration of the printer 1 more than a configuration in which the head 41 is configured to be movable in the direction of conveyance.

In the above description, the printer 1 includes the receiver 60 to obtain the information on at least one of the temperature or the humidity. However, the printer 1 does not have to include the receiver 60 to obtain the information on at least one of the temperature or the humidity. For example, the controller 70 may change the interval between the range of use 46A of the processing liquid nozzle array 44A and the range of use 46B of the ink nozzle array 44B in the direction of conveyance so that the drying time according to the amount of the ink is set based on the information on the amount of the ink ejected to the medium M, instead of the information on at least one of the temperature or the humidity. In this case as well, the drying period can be adjusted to the appropriate length. Further, when adjusting the interval between the range of use 46A of the processing liquid nozzle array 44A and the range of use 46B of the ink nozzle array 44B, the controller 70 maintains the length of the range of use 46A in the processing liquid nozzle array 44A in the direction of conveyance and the length of the range of use 46B in the ink nozzle array 44B in the direction of conveyance. In other words, the controller 70 maintains the amount of conveyance during the conveying operation. This can keep the length of each area (each of areas A1 to A15 in FIG. 8) in the direction of conveyance the same before and after change in the drying period, thereby being able to restrain variations in the image quality.

In the first preferred embodiment described above, the first head 41A is the processing liquid head to eject the processing liquid (corresponding to the first liquid), and the second head 41B is the ink head to eject ink (corresponding to the second liquid). However, the first head 41A does not have to be the processing liquid head, and the second head 41B does not have to be the ink head. That is, the first liquid does not have to be the processing liquid, and the second liquid does not have to be the ink (color ink).

For example, the first head 41A may be the ink head to eject white ink (corresponding to the first liquid), and the second head 41B may be the ink head to eject color ink (corresponding to the second liquid). In this case, such a color image is formed in which the color ink is formed on a base image formed with the white ink. Further, the first head 41A may be the ink head to eject color ink (corresponding to the first liquid), and the second head 41B may be the coating head to eject coating liquid (corresponding to the second liquid). In this case, such a coating image (coating layer) is formed in which the coating liquid is formed on an ink image formed with the ink.

In the first preferred embodiment described above, the first moving unit 20 moves the medium M in the direction of conveyance (corresponding to the first direction). However, the first moving unit 20 does not have to be the one to move the medium M in the first direction (direction of conveyance). For example, the first moving unit 20 may relatively move the head 41 (41A, 41B) and the medium M in the first direction by moving the second moving unit 30 (carriage unit) in the first direction (a so-called gantry type printer). In the case of such a gantry type printer, dots are formed on the medium M such that the first moving operation in which the second moving unit (carriage unit) is moved in the first direction by the first moving unit, and the second moving operation in which the head is moved in the second direction by the second moving unit (corresponding to the "pass" described above) are alternately repeated. In this case, the first moving unit 20 moves the second moving unit (carriage unit) to the upstream side in the first movement direction during the first moving operation. In the case of the gantry type printer as well, the interval in the first direction (corresponding to the interval L10 described above) between the range of use 46A of the first nozzle array 44A and the range of use 46B of the second nozzle array 44B is changed, while the length (corresponding to L2 described above) of the range of use 46A of the first nozzle array 44A in the first direction and the length of the range of use 46B of the second nozzle array 44B in the first direction is maintained, and also the amount of movement (corresponding to L3) when the first moving unit 20 relatively moves the medium M and the nozzle array 44 in the first direction is maintained (see FIG. 9). This makes it possible to adjust the drying period to an appropriate length while restraining variations in the image quality.

The printer 1 described above includes a first head 41A, a second head 41B, a first moving unit 20, and a second moving unit 30. The first head 41A includes a first nozzle array 44A (e.g., processing liquid nozzle array), the first nozzle array 44A including first nozzles 45A (e.g., processing liquid nozzle) arranged in a first direction (e.g., direction of conveyance), the first nozzles 45A capable of ejecting a first liquid (e.g., processing liquid) (see FIG. 2 or 16A). The second head 41B (e.g., ink head) includes a second nozzle array 44B, the second nozzle array 44B including second nozzles 45B arranged in the first direction, the second nozzles 45B capable of ejecting a second liquid (e.g., ink) onto the first liquid (see FIG. 2 or FIG. 16A). The first moving unit 20 relatively moves the head 41 (first head 41A and second head 41B) and the medium M in the first direction. The second moving unit 30 moves the head 41 (first head 41A and second head 41B) in the second direction intersecting the first direction. In a preferred embodiment of the present disclosure, the interval (e.g., interval L10) in the first direction between the range of use 46A of the first nozzle array 44A and the range of use 46B of the second nozzle array 44B is changed, while the lengths of the range of use 46A of the first nozzle array 44A and the range of use 46B of the second nozzle array 44B in the first direction are respectively maintained (see FIG. 9). This makes it possible to adjust the drying period to an appropriate length while restraining variations in image quality.

In the printer 1 described above, it is preferable that the first liquid is a processing liquid. This makes it possible to preferably fix, onto the medium, the second liquid ejected onto the first liquid, thereby being able to improve the image quality.

The printer 1 described above further includes a receiver 60 configured to obtain information on at least one of temperature or humidity. And, based on the information obtained by the receiver 60 (information on at least one of the temperature or the humidity), the interval in the first direction between the range of use 46A of the first nozzle array 44A and the range of use 46B of the second nozzle array 44B is changed (see FIG. 9). This makes it possible to adjust the drying period to an appropriate length.

Further, the receiver 60 described above is a sensor 61 configured to measure at least one of the temperature or the humidity. And, based on the measurement result of the temperature or the humidity of the sensor 61, the interval of the range of use 46A of the first nozzle array 44A and the range of use 46B of the second nozzle array 44B in the first direction is changed (see FIG. 9). This makes it possible to adjust the drying period to an appropriate length.

Note that the receiver 60 described above may obtain the information (information on at least one of temperature or humidity) inputted by a user. This negates the need to provide the sensor 61, thereby being able to simplify a configuration of the printer 1.

Further, the receiver 60 described above may obtain a control signal to control a heating device 50 (e.g., heater 51, air blower 52, etc.), to thereby obtain the information on at least one of the temperature or the humidity. This makes it possible to adjust the drying time to the length suitable for the drying environment adjusted by the heater 50.

Further, in the printer 1 described above, it is preferable that the interval in the first direction between the range of use 46A of the first nozzle array 44A and the range of use 46B of the second nozzle array 44B is reduced more, as the temperature obtained by the receiver 60 is higher or the humidity obtained by the receiver 60 is lower. This makes it possible to adjust the drying period to a shorter period, in the situation where the first liquid is easily dried.

Further, in the printer 1 described above, it is preferable that the interval in the first direction between the range of use 46A of the first nozzle array 44A and the range of use 46B of the second nozzle array 44B is increased more, as the temperature obtained by the receiver 60 is lower, or as the humidity obtained by the receiver 60 is higher. This makes it possible to adjust the drying period to a longer period, in the situation where the first liquid is not easily dried.

Further, in the printer 1 described above, it is preferable to perform multi-pass printing. That is, in the printer 1 described above, it is preferable that the formation of the dots to be formed in the area of the medium M with a width corresponding to a single time of an amount of movement (corresponding to L3 described above) of the first moving operation by the first moving unit 20 is completed by performing a plurality of times of the second moving operation (corresponding to the pass described above) by the second moving unit 30. This makes it possible to improve image quality, as compared to that using the printing method in which the formation of the dots to be formed are completed with a single time of the second moving operation (corresponding to the pass) (one-pass printing).

Further, in the printer described above, it is preferable that the interval in the first direction between the range of use 46A of the first nozzle array 44A and the range of use 46B of the second nozzle array 44B is changed during printing, based on the information (information on at least one of the temperature or the humidity) obtained by the receiver 60 during printing (see FIGS. 12 and 13). This makes it possible to adjust the drying period to an appropriate length according to change in the environment during printing.

Further, it is preferable that when the interval is changed during printing, the length of the range of use 46A of the first nozzle array 44A in the first direction is temporarily changed, and then the length of the range of use 46A of the first nozzle array 44A in the first direction is returned (see the pass 16 to the pass 19 in FIGS. 12 and 13). This makes it possible to restrain excess and deficiency of the first liquid to be applied to the medium M.

In the case where the first liquid is the processing liquid and the first head 41A is the processing liquid head, it is preferable that the first nozzle array 44A (processing liquid nozzle array 44A in this case) is located on the upstream side in the first direction with respect to the second nozzle array 44B (ink nozzle array in this case) (see FIG. 2). This makes it possible to reduce the number of nozzles not used, thereby being able to utilize the nozzles more effectively, as compared to the case where the first nozzle array 44A and the second nozzle array 44B are arranged side by side in the second direction as illustrated in FIG. 16A.

Further, the printer 1 described above changes the interval (e.g., interval L10) in the first direction between the range of use 46A of the first nozzle array 44A and the range of use 46B of the second nozzle array 44B, while the amount of movement (corresponding to L3 described above) when the first moving unit 20 relatively moves the head 41 (first head 41A and second head 41B) and the medium M in the first direction is maintained (see FIG. 9). This makes it possible to adjust the drying period to an appropriate length, while restraining variations in image quality.

The present disclosure is directed to adjusting a drying period to an appropriate length while restraining variations in image quality.

According to the present disclosure, it is possible to adjust a drying period to an appropriate length, while restraining variations in image quality.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A printer comprising:

a first head including a first nozzle array including a plurality of first nozzles arranged in a first direction and capable of ejecting a first liquid;

a second head including a second nozzle array including a plurality of second nozzles arranged in the first direction and capable of ejecting a second liquid that is to be ejected on the first liquid;

a first mover to relatively move the first head, the second head, and a medium in the first direction; and a second mover to move the first head and the second head in a second direction intersecting the first direction; wherein an interval in the first direction between a range of use of the first nozzle array and a range of use of the second nozzle array is changed, while lengths of the range of use of the first nozzle array and the range of use of the second nozzle array in the first direction are respectively maintained.

2. The printer according to claim 1, wherein the first liquid is a processing liquid.

3. The printer according to claim 1, further comprising a receiver to obtain information on at least one of temperature or humidity; wherein the interval is changed based on the information.

4. The printer according to claim 3, wherein the receiver includes a sensor to measure at least one of the temperature or the humidity.

5. The printer according to claim 3, wherein the receiver is operable to obtain the information inputted by a user.

6. The printer according to claim 3, wherein the receiver is operable to obtain a control signal to control a heater, to obtain the information.

7. The printer according to claim 3, wherein the interval is reduced more as the temperature obtained by the receiver is higher or the humidity obtained by the receiver is lower.

8. The printer according to claim 3, wherein the interval is increased more as the temperature obtained by the receiver is lower or the humidity obtained by the receiver is higher.

9. The printer according to claim 1, wherein formation of dots to be formed in an area of the medium with a width corresponding to a single time of an amount of movement of a first moving operation by the first mover is completed by performing a plurality of times of a second moving operation by the second mover.

10. The printer according to claim 1, wherein the interval is changed during printing.

11. The printer according to claim 10, wherein when the interval is changed during printing, the length of the range of use of the first nozzle array in the first direction is temporarily changed, and then the length of the range of use of the first nozzle array in the first direction is returned to the length before the interval is changed.

12. The printer according to claim 1, wherein the first nozzle array is located on an upstream side in the first direction with respect to the second nozzle array.

13. A printer comprising:

a first head including a first nozzle array including a plurality of first nozzles arranged in a first direction and being capable of ejecting a first liquid;

a second head including a second nozzle array including a plurality of second nozzles arranged in the first direction and capable of ejecting a second liquid that is to be ejected on the first liquid;

a first mover to relatively move the first head, the second head, and a medium in the first direction; and a second mover to move the first head and the second head in a second direction intersecting the first direction; wherein an interval in the first direction between a range of use of the first nozzle array and a range of use of the second nozzle array is changed, while an amount of movement when the first mover relatively moves the first head, the second head, and the medium in the first direction is maintained.

* * * * *